United States Patent
Lee et al.

(10) Patent No.: US 9,518,855 B2
(45) Date of Patent: Dec. 13, 2016

(54) OIL DETECTION DEVICE, COMPRESSOR HAVING THE SAME AND METHOD OF CONTROLLING THE COMPRESSOR

(71) Applicant: SAMSUNG ELECTRONICS CO., LTD., Suwon-si, Gyeonggi-do (KR)

(72) Inventors: Hyo Sang Lee, Osan-si (KR); Byung Gu Kim, Suwon-si (KR); Jeong Su Han, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 236 days.

(21) Appl. No.: 14/499,777

(22) Filed: Sep. 29, 2014

(65) Prior Publication Data

US 2015/0168200 A1 Jun. 18, 2015

(30) Foreign Application Priority Data

Dec. 18, 2013 (KR) .................. 10-2013-0158482

(51) Int. Cl.
*G01F 23/26* (2006.01)
(52) U.S. Cl.
CPC ........... *G01F 23/265* (2013.01); *G01F 23/266* (2013.01); *G01F 23/268* (2013.01)
(58) Field of Classification Search
CPC ..... G01F 23/265; G01F 23/266; G01F 23/268
See application file for complete search history.

(56) References Cited

U.S. PATENT DOCUMENTS

| | | | |
|---|---|---|---|
| 5,040,422 A | | 8/1991 | Frankenberger et al. |
| 5,765,994 A | * | 6/1998 | Barbier ............... F04B 39/0207 250/577 |
| 8,733,116 B2 | * | 5/2014 | Won .................... F04B 39/0207 62/193 |
| 2003/0000303 A1 | * | 1/2003 | Livingston ............ G01F 23/268 73/304 C |
| 2007/0000319 A1 | * | 1/2007 | Sasaki ................... G01F 23/268 73/301 |
| 2008/0066543 A1 | * | 3/2008 | Sabini ..................... G01F 23/02 73/304 C |

(Continued)

FOREIGN PATENT DOCUMENTS

| | | |
|---|---|---|
| EP | 2 128 542 | 12/2009 |
| EP | 2 357 432 | 8/2011 |

(Continued)

OTHER PUBLICATIONS

PCT International Search Report dated Mar. 18, 2015 in corresponding International Patent Application No. PCT/KR2014/012251.

(Continued)

*Primary Examiner* — Francis Gray
(74) *Attorney, Agent, or Firm* — Staas & Halsey LLP

(57) ABSTRACT

An oil detection device for a compressor to detect at least two levels of oil in the compressor includes a first detection unit including a first reference electrode and a first detection electrode disposed at both sides of the first reference electrode, and a second detection unit including a second reference electrode spaced from the first reference electrode and a second detection electrode disposed at both sides of the second reference electrode.

44 Claims, 16 Drawing Sheets

(56) References Cited

U.S. PATENT DOCUMENTS

| | | | |
|---|---|---|---|
| 2010/0196170 A1 | 8/2010 | Chen et al. | |
| 2011/0113878 A1* | 5/2011 | Ohshima | G01F 23/266 73/304 C |
| 2011/0239672 A1 | 10/2011 | Won et al. | |
| 2011/0259098 A1* | 10/2011 | Park | G01F 23/265 73/304 C |
| 2015/0064040 A1* | 3/2015 | Brostrom | F04C 29/021 418/84 |

FOREIGN PATENT DOCUMENTS

| | | | |
|---|---|---|---|
| JP | 3-175180 | | 7/1991 |
| JP | 04241797 A | * | 8/1992 |
| JP | 2001012351 A | * | 1/2001 |
| JP | 2001-264446 | | 9/2001 |
| JP | 2006029160 A | * | 2/2006 |
| JP | 2006-300606 | | 11/2006 |
| JP | 2008-96019 | | 4/2008 |
| JP | 2016090300 A | * | 5/2016 |
| KR | 10-1991-0008280 | | 5/1991 |
| KR | 1998-010736 | | 5/1998 |
| KR | 10-1999-0078591 | | 11/1999 |
| KR | 10-2005-0120240 | | 12/2005 |
| KR | 10-2006-0081937 | | 7/2006 |
| KR | 10-2011-0110662 | | 10/2011 |
| KR | 10-2011-0110663 | | 10/2011 |

OTHER PUBLICATIONS

Australian Office Action dated Jul. 18, 2016 in corresponding Australian Patent Application No. 2014367568.

* cited by examiner

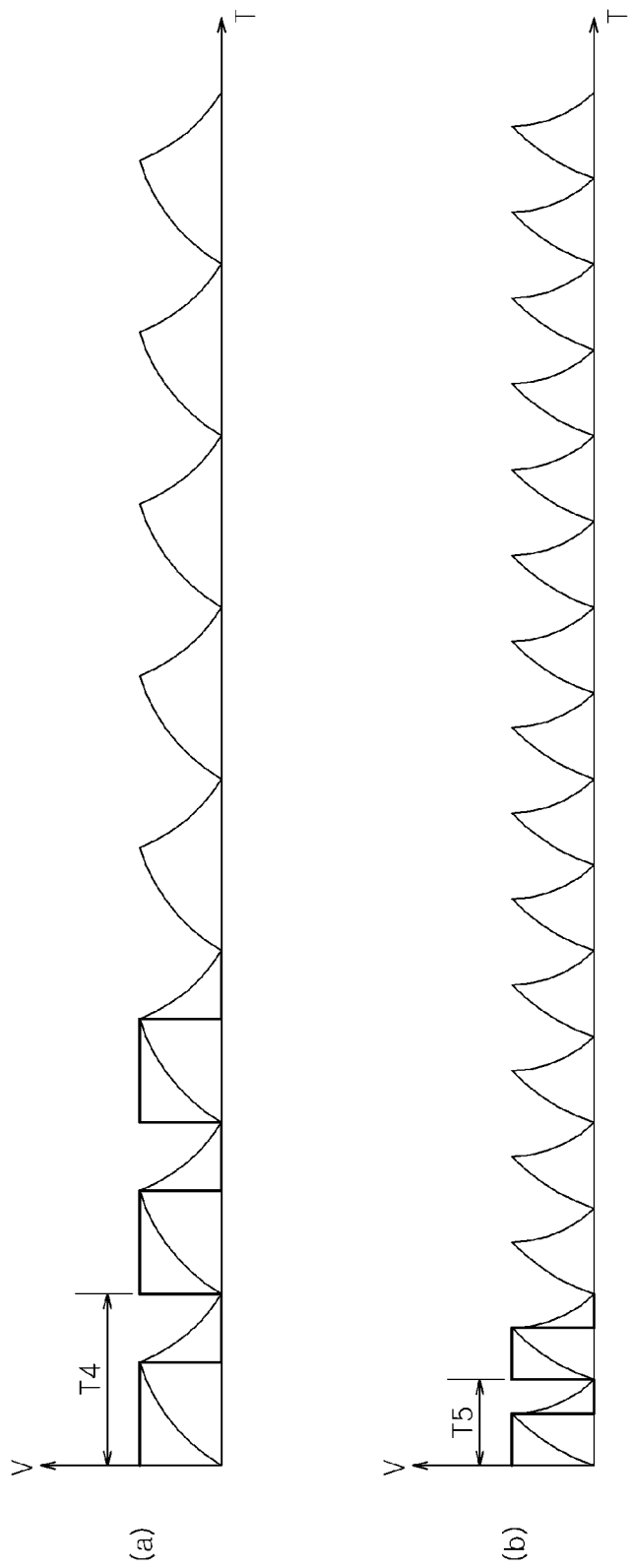

OIL DETECTION DEVICE, COMPRESSOR HAVING THE SAME AND METHOD OF CONTROLLING THE COMPRESSOR

CROSS-REFERENCE TO RELATED APPLICATIONS

This application claims the benefit of Korean Patent Application No. 10-2013-0158482, filed on Dec. 18, 2013 in the Korean Intellectual Property Office, the disclosure of which is incorporated herein by reference.

BACKGROUND

1. Field

Embodiments of the present disclosure relate to an oil detection device to detect a level of oil in a compressor, a compressor having the same and a method of controlling the compressor.

2. Description of the Related Art

A compressor has a structure in which a compression assembly to aspirate and compress a refrigerant is disposed in a lower part of a casing and an electric assembly is disposed in an upper part of the compression assembly.

In this case, the compression and electrical assemblies share a rotating shaft, the rotating shaft is rotated based on power generated by the electric assembly and the compression assembly coupled to the rotating shaft is operated through such rotation, thus causing compression.

Supply of oil to the bearings, rolling pistons and the like of the compression assembly is required in order to facilitate rotation of the compression assembly. When oil is disposed in a lower part of the casing, the oil is stored in an oil storage area, pumped by an oil feeder mounted in a lower part of the rotating shaft, and then supplied to the compression assembly.

Oil performs lubrication action and contributes to cooling of the electric assembly. Control of a stable supply of an appropriate amount of oil is essential to the lifespan and operational efficiency of the compressor.

However, as configurations of the compressor gradually become more complicated and compressors are used for large air conditioners, multi-air conditioning systems and the like, pipes in which oil and working fluids flow are increased in length and control of oil levels in the compressors thus gradually become more difficult.

In particular, as the length of pipes increase, an amount of residual oil in pipes increases and amounts of oil stored in the oil storage area are irregularly and greatly changed during operation although an appropriate amount of oil being supplied in an early stage.

For this reason, there is a need for continuously or periodically checking the level of oil in the oil storage area and an oil collection operation to collect oil in the compressor may be required when a level of oil is determined to be an appropriate level or less, as a result of the check.

Such an oil level is commonly checked by the naked eye through a transparent window formed in the compressor casing, but this method is not economically efficient and an oil collection operation is thus actually performed on a cycle of a predetermined time, regardless of oil levels.

However, in this case, in actuality, the oil collection operation may be compulsively performed although an oil level is sufficient. For this reason, for example, air conditioners inefficiently consume energy while not providing cooling.

In recent years, an oil collection operation has been developed that may be performed based on oil level detected through an additional oil level sensor mounted in the compressor casing.

The oil level sensor as described above may have the effects of reducing unnecessary oil collection operation, thus decreasing energy consumption and increasing compressor operation time according to intended application. However, a calculation operation for converting a physical property value into an oil level is involved, thus disadvantageously making an overall configuration complicated and increasing cost, because a physical property value changed according to contact with oil is read, an oil level corresponding to the measured physical property value is calculated and an actual oil level is checked, the actual oil level is compared with a preset level and whether or not oil collection operation is performed is determined.

SUMMARY

Therefore, it is an aspect of the present disclosure to provide an oil detection device to detect at least two levels of oil stored therein, a compressor having the same and a method of controlling the compressor.

It is another aspect of the present disclosure to provide an oil detection device having a flow unit to prevent accumulation of oil, a compressor having the same and a method of controlling the compressor.

It is another aspect of the present disclosure to provide an oil detection device to output, as a detection signal, a mixed voltage signal corresponding to capacitances generated by a plurality of detection units, a compressor having the same and a method of controlling the compressor.

Additional aspects of the disclosure will be set forth in part in the description which follows and, in part, will be apparent from the description, or may be learned by practice of the disclosure.

In accordance with one aspect of the present disclosure, an oil detection device for a compressor to detect a level of oil in the compressor includes a first detection unit including a first reference electrode and a first detection electrode disposed at both sides of the first reference electrode, and a second detection unit including a second reference electrode spaced from the first reference electrode and a second detection electrode disposed at both sides of the second reference electrode.

The first detection electrode may include a first base unit spaced from one side of the first reference electrode by a predetermined distance and a first augmenting unit spaced from the other side of the first reference electrode by a predetermined distance, and the second detection electrode may include a second base unit spaced from one side of the second reference electrode by a predetermined distance and a second augmenting unit spaced from the other side of the second reference electrode by a predetermined distance.

The first base unit and the first augmenting unit may be parallel to the first reference electrode, and the second base unit and the second augmenting unit may be parallel to the second reference electrode.

The first base unit and the first augmenting unit may be nonparallel to the first reference electrode, and the second base unit and the second augmenting unit may be nonparallel to the second reference electrode.

The first detection unit may further include at least one first connection member to connect the first base unit to the first augmenting unit, and the second detection unit may further include at least one second connection member to connect the second base unit to the second augmenting unit.

The oil detection device may further include a spacing member to connect the first reference electrode to the second reference electrode such that the first reference electrode is spaced from the second reference electrode.

The oil detection device may further include a first flow unit disposed on the first reference electrode, the first flow unit inducing flow of the oil, and a second flow unit disposed on the second reference electrode, the second flow unit inducing flow of the oil.

The first flow unit may extend in the direction of gravity from the first reference electrode and have a predetermined inclination from one side to the other side.

The second flow unit may extend in the direction of gravity from the second reference electrode and have a predetermined inclination from one side to the other side.

The first flow unit may extend in the direction of gravity from the first reference electrode and have a triangular shape.

The second flow unit may extend in the direction of gravity from the second reference electrode and have a triangular shape.

The first flow unit may extend in the direction of gravity from the first reference electrode and have a saw-tooth shape.

The second flow unit may extend in the direction of gravity from the second reference electrode and have a saw-tooth shape.

The first flow unit may have the same shape as the second flow unit and the first flow unit may have a different size from the second flow unit.

The first detection unit may output, as a first detection signal, a signal corresponding to a capacitance between the first reference electrode and the first base unit and a capacitance between the first reference electrode and the first augmenting unit, and the second detection unit may output, as a second detection signal, a signal corresponding to a capacitance between the second reference electrode and the second base unit and a capacitance between the second reference electrode and the second augmenting unit.

The first detection unit may output a mixed one of the first detection signal and the second detection signal of the second detection unit when outputting the first detection signal.

In accordance with another aspect of the present disclosure, an oil detection device for a compressor includes a reference unit to which an input signal is applied, a base unit disposed at one side of the reference unit, the base unit outputting a detection signal, a first augmenting unit disposed at the other side of the reference unit, the first augmenting unit outputting a detection signal, and a flow unit disposed in any one of the reference unit, the base unit and the first augmenting unit, the flow unit forming a passage in which an oil flows.

The base unit may be electrically connected to the first augmenting unit.

The flow unit may extend from any one of the reference unit, the base unit and the first augmenting unit in the direction of gravity.

The reference unit, the base unit and the first augmenting unit may have a plate shape, and the reference unit, the base unit and the first augmenting unit may be disposed such that opposite surfaces thereof are parallel to one another.

The reference unit, the base unit and the first augmenting unit may have a plate shape, and the reference unit, the base unit and the first augmenting unit may be disposed such that opposite surfaces thereof are nonparallel to one another.

The flow unit may have at least one shape of triangular, saw-tooth and arch shapes.

In accordance with another aspect of the present disclosure, an oil detection device for a compressor to detect a level of an oil in the compressor includes a first detection unit including a first reference electrode and a first detection electrode disposed at both sides of the first reference electrode, and a second detection unit including a second reference electrode spaced from the first reference electrode and a second detection electrode disposed at both sides of the second reference electrode, wherein the first detection electrode of the first detection unit and the second detection electrode of the second detection unit are electrically connected to each other and transmit a detection signal to a control unit to control an oil collection operation.

The oil detection device may further include an input terminal to input an input signal to the first reference electrode and the second reference electrode, and an output terminal connected to the first detection electrode and the second detection electrode, the output terminal outputting a detection signal of the first detection electrode and the second detection electrode.

In accordance with another aspect of the present disclosure, a compressor includes a first detection unit including a first reference electrode and a first detection electrode disposed at both sides of the first reference electrode, a second detection unit including a second reference electrode spaced from the first reference electrode and a second detection electrode disposed at both sides of the second reference electrode, and a control unit converting a detection signal input from the first detection unit and the second detection unit into an electric signal, the control unit determining a level of an oil based on the converted electric signal.

The electric signal may be a frequency or a voltage signal.

The first detection electrode may include a first base unit spaced by a predetermined distance from one side of the first reference electrode and a first augmenting unit spaced by a predetermined distance from the other side of the first reference electrode, and the second detection electrode may include a second base unit spaced by a predetermined distance from one side of the second reference electrode and a second augmenting unit spaced by a predetermined distance from the other side of the second reference electrode.

The first augmenting unit may output a voltage corresponding to a capacitance generated by the first base unit, and the second augmenting unit may output a voltage corresponding to a capacitance generated by the second base unit.

The control unit may control an oil collection operation based on the level of the oil.

The first base unit and the first augmenting unit may be parallel to the first reference electrode, and the second base unit and the second augmenting unit may be parallel to the second reference electrode.

The first base unit and the first augmenting unit may have a predetermined inclination with respect to the first reference electrode, and the second base unit and the second augmenting unit may have a predetermined inclination with respect to the second reference electrode.

The compressor may further include a first flow unit disposed on the first reference electrode, the first flow unit inducing flow of the oil, and a second flow unit disposed on the second reference electrode, the second flow unit inducing flow of the oil.

The first flow unit may extend in the direction of gravity from the first reference electrode and may have a predetermined inclination from one side to the other side.

The second flow unit may extend in the direction of gravity from the second reference electrode and has a predetermined inclination from one side to the other side.

The first flow unit may extend in the direction of gravity from the first reference electrode and has at least one shape of triangular, saw-tooth and arch shapes.

The second flow unit may extend in the direction of gravity from the second reference electrode and has at least one shape of triangular, saw-tooth and arch shapes.

The control unit may transmit an input signal to the first reference electrode of the first detection unit and the second reference electrode of the second detection unit, and input a combined voltage corresponding to capacitances generated by the first detection electrode of the first detection unit and the second detection electrode of the second detection unit.

In accordance with yet another aspect of the present disclosure, a method of controlling a compressor includes inputting a detection signal from a first detection unit and a second detection unit disposed in the compressor, converting the input detection signal into an electric signal, determining a level of an oil in the compressor based on the converted electric signal, and controlling an oil collection operation when the determined oil level is lower than a preset level.

The inputting may include inputting the detection signal of the first detection unit and the second detection unit from one detection terminal.

The converting may include converting a voltage signal corresponding to a capacitance generated by the first detection unit and the second detection unit into a pulse signal.

The determining may include confirming a frequency corresponding to the pulse signal, and determining the level of the oil based on the confirmed frequency.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 16, parts (a) and (b), shows graphs illustrating another example of a signal obtained by signal-processing the output signal of the oil detection device according to the embodiment.

DETAILED DESCRIPTION

Figure 1:
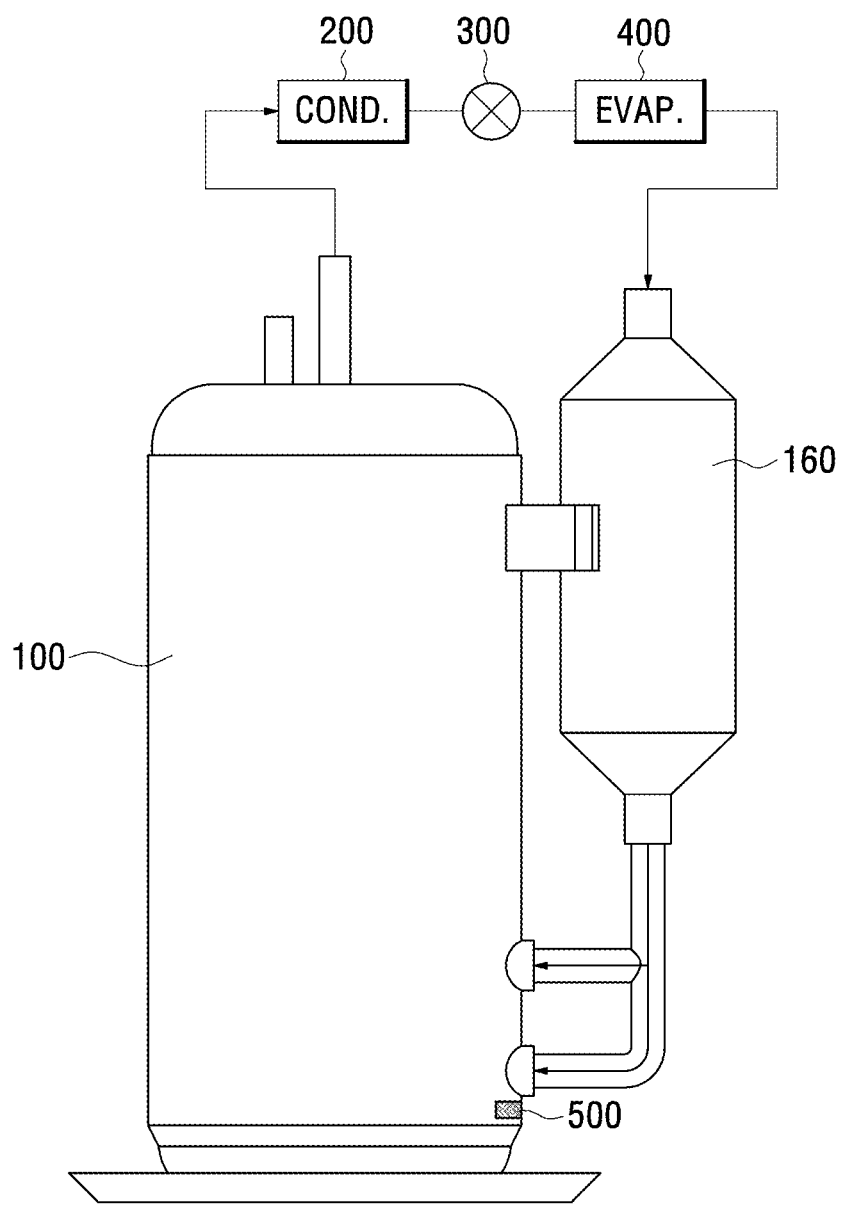
FIG. 1 is an exemplary view illustrating a refrigeration cycle having a compressor according to an embodiment.

Reference will now be made in detail to the embodiments of the present disclosure, examples of which are illustrated in the accompanying drawings, wherein like reference numerals refer to like elements throughout.

FIG. 1 is a view illustrating an example of a refrigeration cycle having a compressor according to an embodiment.

The refrigeration cycle includes a compressor 100, a first heat exchanger 200, an expansion valve 300 and a second heat exchanger 400.

The compressor 100 compresses a refrigerant and discharges the compressed refrigerant as a high-temperature high-pressure gas to the first heat exchanger 200.

The first heat exchanger 200 is connected to a discharge outlet of the compressor 100 through a refrigerant pipe and condenses the refrigerant supplied from the compressor 100 through heat emission of the refrigerant. In this case, the high-temperature high-pressure gas refrigerant is phase-changed into a high-temperature high-pressure liquid refrigerant.

The first heat exchanger 200 serves as a condenser which emits heat to the surroundings through a compression process.

The expansion valve 300 is interposed between the first heat exchanger 200 and the second heat exchanger 400.

The expansion valve 300 decreases pressure and temperature of the refrigerant supplied from the first heat exchanger 200 and then transfers the refrigerant to the second heat exchanger 400 to facilitate heat absorption through evaporation of the refrigerant.

That is, the refrigerant, after passing through the expansion valve 300, is phase-changed from the high-temperature high-pressure liquid to the low-temperature low-pressure liquid. The expansion valve may be implemented as a capillary tube.

The second heat exchanger 400 is disposed in an indoor area and performs heat exchange with indoor air through heat absorption based on evaporation of the refrigerant supplied from the expansion valve 300. In this case, the low-temperature low-pressure liquid refrigerant is phase-changed to a low-temperature low-pressure gas refrigerant.

The second heat exchanger 400 serves as an evaporator.

The refrigeration cycle further includes an accumulator 160 to prevent damage to the compressor.

The accumulator 160 is disposed in an aspiration area of the compressor 100 and separates an un-gasified liquid refrigerant from the refrigerant moved from the second heat exchanger 400 to the compressor 100, to prevent transfer of the liquid refrigerant to the compressor 100 and thereby prevent damage to the compressor 100.

Furthermore, the refrigeration cycle further comprises an oil detection device 500 to detect a level of oil supplied to the compressor for efficient rotation of the compression assembly and cooling of the electric assembly.

In addition, the refrigeration cycle further includes a control unit 610 to perform signal processing on a detection signal of the oil detection device 500 and to control oil collection operation of the compressor based on the detected oil level. Configurations of the oil detection device 500 and the control unit 610 (see FIG. 12) will be described later.

In the case of an apparatus (for example, an air conditioner) to which the refrigeration cycle is applied, the apparatus may further include a first fan (not shown) which is disposed around the first heat exchanger 200 and is rotated by a motor and thereby facilitates heat radiation of the refrigerant, and a second fan (not shown) which is disposed around the second heat exchanger 400 and is rotated by the motor and thereby forcibly blows the heat-exchanged air.

In addition, the refrigeration cycle may further include an oil separator to separate an oil incorporated in a steam of the refrigerant discharged by the compressor 100 and to supply the oil back to the compressor 100.

In addition, when the refrigeration cycle is applied to an air conditioner, the air conditioner may further include a four-way valve (not shown) which is mounted around an inlet of the compressor 100 and changes flow direction of the refrigerant according to heating and cooling operations.

During a cooling operation, the four-way valve guides a high-temperature high-pressure refrigerant discharged from the compressor 100 to the first heat exchanger 200 and discharges a low-temperature low-pressure refrigerant from the second heat exchanger 400 to the accumulator 160. In this case, the first heat exchanger 200 serves as a condenser and the second heat exchanger 400 serves as an evaporator.

During a heating operation, the four-way valve guides the high-temperature high-pressure refrigerant discharged from the compressor 100 to the second heat exchanger 400 and guides the low-temperature low-pressure refrigerant from the first heat exchanger 200 to the accumulator 160. The first heat exchanger 200 serves as an evaporator and the second heat exchanger 400 serves as a condenser.

Figure 2:
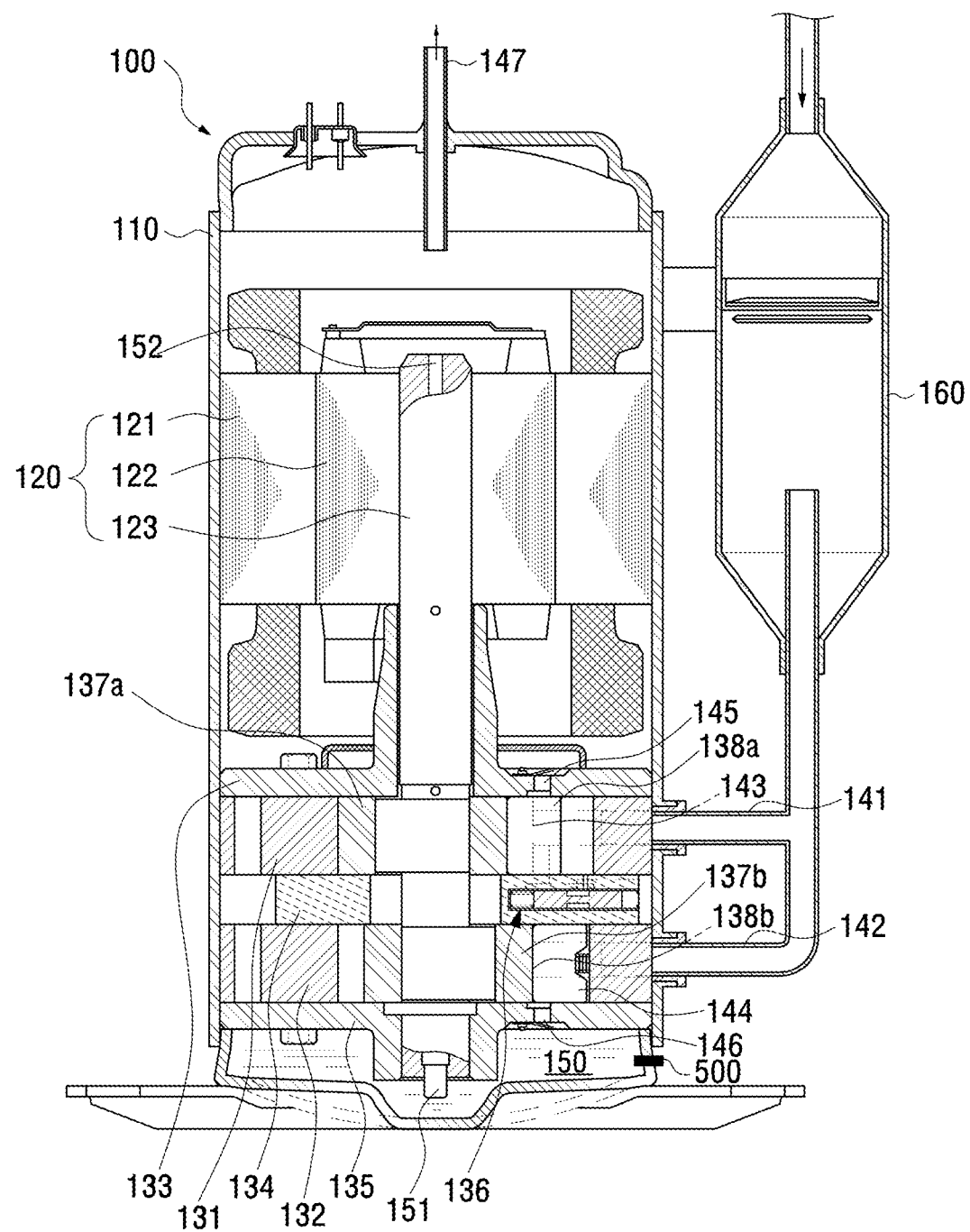
FIG. 2 is a sectional view illustrating a compressor having an oil detection device according to an embodiment.

FIG. 2 is a sectional view illustrating a compressor 100 provided with an oil detection device 500 and an accumulator 160 according to an embodiment.

The compressor 100 includes a casing 110 to form an outer appearance, an electric assembly 120 mounted in an inside upper part of the casing 110 and a compression assembly 130 mounted in an inside lower part of the casing 110.

The electric assembly 120 includes a cylindrical stator 121 formed on an inner surface of the casing 110, a rotor 122 rotatably mounted in an inner area of the stator 121 and a rotating shaft 123 connecting the electric assembly 120 to the compression assembly 130 and being coupled to a center of the rotor 122.

The electric assembly 120 drives the compression assembly 130 connected through the rotating shaft 123 through rotation of the rotor 122 when power is applied thereto.

The compression assembly 130 includes plurality of cylinders 131 and 132 having a mutually separated inner area, a plurality of bearing plates 133, 134 and 135 to form an inner area together by cutting upper and lower parts of the respective cylinders 131 and 132, and a valve assembly 136 to selectively operate the cylinders 131 and 132.

The cylinders 131 and 132 may be provided in the casing 110.

The cylinders 131 and 132 include an inner area formed in the casing 110, rolling pistons 137a and 137b performing a turning movement based on eccentricity in the inner area, vanes 138a and 138b contacting the rolling pistons 137a and 137b in a radius direction and dividing the inner area into an aspiration area and a compression area, and a vane chamber depressed toward an outside such that the vanes 138a and 138b are extended and retreated.

The compression assembly 130 will be described in more detail.

The cylinders 131 and 132 include a first cylinder 131 provided with a first inner area and a second cylinder 132 provided with a second inner area and disposed in a lower part of the first cylinder 131.

The bearing plates 133, 134 and 135 form an inner area together by cutting upper and lower parts of the cylinders 131 and 132 and include a second bearing plate 133 provided between the first cylinder 131 and the second cylinder 132, and a second bearing plate 134 and a third bearing plate 135 respectively provided in an upper part of the first cylinder 131 and a lower part of the second cylinder 132 such that they close an upper opening of the first inner area and a lower opening of the second inner area, respectively, and support the rotating shaft 123.

The compressor includes aspiration inlets 143 and 144 connected to aspiration pipes 141 and 142 to supply gas into the first inner area and the second inner area in the first cylinder 131 and the second cylinder 132, outlets 145 and 146 to discharge gas compressed in the respective compression areas into the casing 110 and a discharge pipe 147 provided in an upper part of the casing 110.

The compressor further includes an oil storage chamber 150 to supply oil to the assembly bearings, the rolling pistons and the electric assembly of the compression assembly for smooth rotation of the compression assembly and cooling of the electric assembly.

Accordingly, an inner part of the casing 110 is maintained at a high pressure through a compressed gas discharged through the discharge outlets 145 and 146 when the compressor 100 is operated, and the compressed gas present in the casing 110 is guided to the outside through the discharge pipe 147 provided in a upper part of the casing 110.

The gas aspirated by the compressor passes through the accumulator 160 and is then guided through the aspiration pipes 141 and 142 to the aspiration inlets 143 and 144 of the respective inner areas.

The rotating shaft 123 penetrates centers of the first inner area and the second inner area and are connected to the first rolling piston 137a and the second rolling piston 137b provided in the first inner area and the second inner area.

The first rolling piston 137a and the second rolling piston 137b are coupled to the rotating shaft 123, more specifically, are coupled thereto based on different directions of eccentricity. Through such a configuration, the first rolling piston 137a and the second rolling piston 137b compress an object while eccentrically rotating in the inner area.

Refrigerants are aspirated, compressed and discharged to upper and lower compression areas based on eccentric rotation of the first and second rolling pistons 137a and 137b.

The first and second rolling pistons 137a and 137b are eccentrically mounted on the rotating shaft 123.

The rotating shaft 123 is disposed in a longitudinal direction of the casing 110, an oil feeder 151 is formed in a lower part thereof and an oil passage 152 penetrates an inner part.

Accordingly, upon rotation of the rotating shaft 123, an oil stored in the oil storage chamber 150 provided in a lower part of the casing 110 along the oil feeder 151 is moved along the oil passage 152 and is supplied to bearings and pistons of the compression assembly.

The vanes 138a and 138b include a first vane 138a provided in the first cylinder 131 and a second vane 138b provided in the second cylinder 132, and are provided such that the vanes contact the rolling pistons 137a and 137b in a radius direction and divide the inner area into the aspiration area and the compression area.

The vane chamber may include a first vane chamber provided in the first cylinder 131 and a second vane chamber provided in the second cylinder 132.

The vane chamber is depressed toward an outside of the inner area, and the first vane chamber may include a first vane guide portion guiding the first vane 138a and a sealed area which extends from the first vane guide portion and has a greater width than the first vane guide portion so that the first vane 138a contacting the first rolling piston 137a is extended and retreated when the first rolling piston 137a is rotated.

The second vane chamber includes a second vane guide portion which is depressed toward the outside from an inner wall of the second inner area and guides the second vane 138b, and a vane spring-accommodating portion provided with a vane spring applying a pressure to the second vane 138b toward the second rolling piston 137b so that the second vane 138b divides the second inner area.

The valve assembly 136 is provided in at least one of the bearing plates 133, 134 and 135 in the casing 110 and selectively connects an aspiration area refrigerant and a discharge area refrigerant to the vane chamber such that the vanes 138a and 138b contact or are separated from the rolling pistons 137a and 137b according to pressure variation of the vane chamber.

The valve assembly 136 may be provided in a side surface of the bearing plates 133, 134 and 135.

The accumulator 160 is disposed at a side of the casing 110 of the compressor and gasifies a liquid substance from a mixture of a refrigerant and an oil which is discharged through the compressor, circulates in a refrigeration cycle, for example, a refrigeration cycle in a refrigerator or an air conditioner, connected to the compressor, and is then returned back.

The accumulator 160 communicates with the upper aspiration pipe 141 and the lower aspiration pipe 142 mounted at the side of the casing 110 of the compressor and transfers the refrigerant through the aspiration pipes to the compressor.

The compressor is provided in the oil storage chamber 150 and further includes an oil detection device 500 to detect an oil and a level of the oil in the oil storage chamber 150.

Level variation during operation and level variation caused by loss and leakage of oil may be determined by detecting the level of oil in the compressor using the oil detection device 500.

As a result, the oil level is maintained at a preset level during operation of the compressor, thus enabling the compressor to normally operate.

Such an oil detection device will be described with reference to FIGS. 3 to 10.

Figure 3:
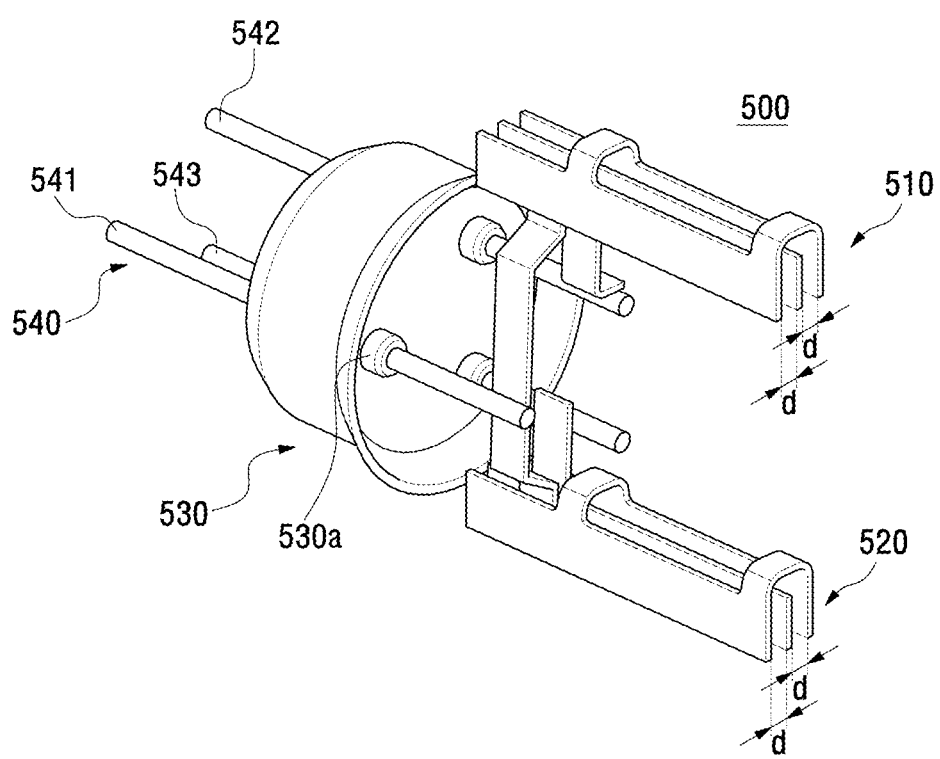
FIG. 3 is an exemplary view illustrating an oil detection device according to an embodiment.

FIG. 3 is a view illustrating an example of an oil detection device 500 according to an embodiment.

The oil detection device 500 includes a first detection unit 510, a second detection unit 520, a capping unit 530 and a connection unit 540.

The first detection unit 510 detects a level of oil stored in the oil storage chamber 150. In this case, the first detection unit 510 determines whether or not the oil level is a first level.

That is, the first detection unit 510 outputs different detection signals in a case in which the oil level is lower than the first level and a case in which the oil level is equal to or higher than the first level. Accordingly, whether or not the oil level maintains the first level or higher is determined, based on the detection signal detected by the first detection unit 510.

The second detection unit 520 is spaced from the first detection unit 510 and detects a level of oil stored in the oil storage chamber 150. In this case, the second detection unit 520 determines whether or not the oil level is a second level.

That is, the second detection unit 520 outputs different detection signals in a case in which the oil level is lower than the second level and a case in which the oil level is equal to or higher than the second level. Accordingly, whether or not the oil level maintains the second level or higher is determined, based on the detection signal detected by the second detection unit 520.

Here, the first level is a level higher than the second level, the first level is a maximum oil level enabling normal operation of the compressor, and the second level is a minimum oil level enabling normal operation of the compressor.

The first detection unit 510 and the second detection unit 520 will be described later.

The capping unit 530 is coupled to the oil storage chamber 150 of the compressor and is connected to the first detection unit 510 and the second detection unit 520. The capping unit 530 includes a plurality of holes and the holes pass through a plurality of connection units 540.

When the capping unit 530 is composed of a conductive material, an insulating member 530a to enable sealing and electrical insulation of the capping unit 530 and the connection unit 540 may be disposed in an area where the connection unit 540 contacts the capping unit 530.

That is, the insulating member 530a may be inserted into the connection unit 540 and each of the holes of the capping unit 530.

The connection unit 540 electrically connects the first detection unit 510 and the second detection unit 520 to the control unit 610 and includes a plurality of connection terminals 541, 542 and 543.

The connection unit 540 includes a first connection terminal 541 connected to first and second reference units 511 and 521 corresponding to reference electrodes, a second connection terminal 542 connected to the first base unit 512 corresponding to a detection electrode of the first detection unit 510, and a third connection terminal 543 connected to the second base unit 522 corresponding to a detection electrode of the second detection unit 520.

Here, the first detection unit 510 and the second detection unit 520 are connected to one end of the first connection terminal 541, the second connection terminal 542 and the third connection terminal 543, and the control unit 610 is connected to another end thereof.

That is, the first connection terminal 541 is an input terminal to input an input signal and the second connection terminal 542 and the third connection terminal 543 are output terminals to output a detection signal, the first connection terminal 541 of the connection unit transfers the input signal transmitted from the control unit 610 to the first detection unit 510 and the second detection unit 520, and the second connection terminal 542 and the third connection terminal 543 transfer the detection signal detected by the first detection unit 510 and the second detection unit 520 to the control unit 610.

Further, the second connection terminal 542 and the third connection terminal 543 are electrically connected to each other, to combine the detected detection signals into a mixed signal and transfer the resulting signal to the control unit 610.

The first detection unit 510 and the second detection unit 520 of the oil detection device will be described in detail with reference to FIGS. 4 and 5.

Figure 4:
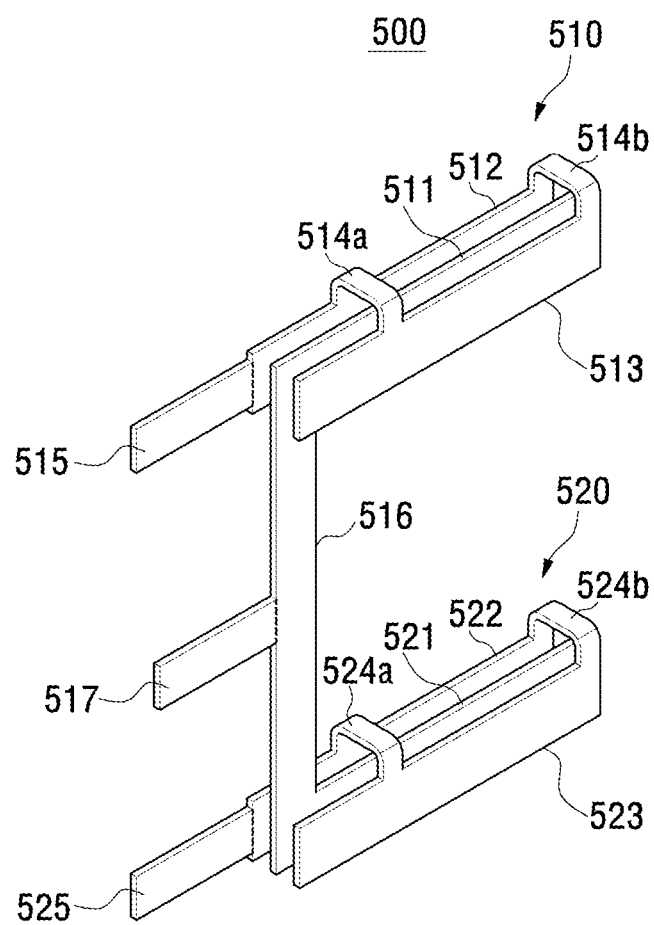
FIG. 4 is an exemplary assembled view illustrating the first detection unit and the second detection unit provided in the oil detection device according to the embodiment.

As shown in FIG. 4, the first detection unit 510 includes a first reference unit 511 corresponding to a first reference electrode, and a first base unit 512 and a first augmenting unit 513 corresponding to first detection electrodes.

The first base unit 512 and the first augmenting unit 513 are disposed at both sides of the first reference unit 511 such that the first reference unit 511 is interposed therebetween, and are each spaced from the first reference unit 511 by a predetermined distance d (see FIG. 3).

That is, the first base unit 512 and the first augmenting unit 513 surround the first reference unit 511 and are disposed such that opposite surfaces thereof are parallel to each other.

The first base unit 512 and the first augmenting unit 513 are symmetrical to each other based on the first reference unit 511 and have the same size.

That is, the first base unit 512 and the first augmenting unit 513 are formed in a plate shape, the width and length of the first base unit 512 are the same as those of the first augmenting unit 513, and the first base unit 512 and the first augmenting unit 513 have the same area.

Furthermore, the first reference unit 511 also has a plate shape and has the same size as the first base unit 512.

By disposing the first base unit 512 and the first augmenting unit 513 at both sides of the first reference unit 511 as described above, a capacitance generated between the first augmenting unit 513 is added to a capacitance generated between the first base unit 512 to increase capacitance generated by the first detection unit 510 and detection accuracy of oil is thus improved.

The first base unit 512 and the first augmenting unit 513 are electrically connected to each other through the first connection members 514a and 514b.

The first connection members 514a and 514b maintain the distance between the first base unit and the first augmenting unit.

The first connection member may be implemented with one or more first connection members.

The first detection unit 510 is integrally connected to the first base unit 512 and further includes a first joint terminal 515 electrically and mechanically connected to the second connection terminal 542 of the connection unit.

The first joint terminal 515 extends toward an outside from a side end of the first base unit 512.

The second detection unit 520 includes a second reference unit 521 corresponding to a second reference electrode, and a second base unit 522 and a second augmenting unit 523 corresponding to second detection electrodes.

The second base unit 522 and the second augmenting unit 523 are disposed at both sides of the second reference unit 521 such that the second reference unit 521 is interposed therebetween, and are each spaced from the second reference unit 521 by a predetermined distance d (see FIG. 3).

That is, the second base unit 522 and the second augmenting unit 523 surround the second reference unit 521, and the second reference unit 521, and the second base unit 522 and the second augmenting unit 523 are disposed such that opposite surfaces thereof are parallel to one another.

The compressor 100 operates at a temperature of −30° C. to 120° C.

Viscosity of oil in the compressor increases at temperatures below zero. As such, although the viscosity of the oil increases, there may be a need for prevention of accumulation of oil in the detection units for sufficient distinguishing.

In order to prevent accumulation of oil in the detection units, a distance d between the reference unit as the reference electrode and the base unit or the augmenting unit as the detection electrodes is acquired by experimentation.

| | Distance | | | | | | | | |
|---|---|---|---|---|---|---|---|---|---|
| | 1 mm | | | 1.5 mm | | | 2 mm | | |
| Oil temperature (° C.) | 100 | 25 | −20 | 100 | 25 | −20 | 100 | 25 | −20 |
| Oil discharge time | 45 sec | 10 min or longer | 10 min or longer | 5 sec | 90 sec | 10 min or longer | 1 sec | 30 sec | 305 sec |

By setting the distance between the reference electrode and the detection electrode to 2 mm or more, thereby maximizing prevention of oil accumulation between the electrodes.

In addition, the distance between the electrodes is maintained, thereby keeping a capacitance detected by the respective detection units constant.

As such, a total distance of the two detection electrodes surrounding the reference electrode is kept constant, thereby keeping a combined capacitance of the first detection unit and the second detection unit constant.

The second base unit 522 and the second augmenting unit 523 are symmetrical to each other based on the second reference unit 521 and have the same size.

That is, the second base unit 522 and the second augmenting unit 523 are formed in a plate shape, the width and length of the second base unit 522 are the same as those of the second augmenting unit 523, and the second base unit 522 and the second augmenting unit 523 have the same area.

Furthermore, the second reference unit 521 may have a plate shape and have the same size as the second base unit 522.

The second reference unit 521, the second base unit 522 and the second augmenting unit 523 may be disposed such that opposite surfaces thereof are parallel to each other.

By disposing the second base unit 522 and the second augmenting unit 523 at both sides of the second reference unit 521 as described above, a capacitance generated between the second augmenting unit 523 is added to a capacitance generated between the second base unit 522 to increase capacitance generated by the second detection unit 520 and detection accuracy of oil is thus improved.

The second base unit 522 and the second augmenting unit 523 are electrically connected to each other through second connection members 524a and 524b.

The second connection members 524a and 524b keep the distance between the second base unit and the second augmenting unit constant.

The second connection members 524a and 524b may be implemented with as one or more second connection members.

The second detection unit 520 is integrally connected to the second base unit 522 and further includes a second joint terminal 525 electrically and mechanically connected to the third connection terminal 543 of the connection unit.

The second joint terminal 525 extends toward an outside from a side end of the second base unit 522.

In addition, the oil detection device further includes a spacing member 516 which is disposed between the first reference unit 511 of the first detection unit and the second reference unit 521 of the second detection unit and contacts the first reference unit 511 and the second reference unit 521 such that the spacing member 516 is electrically connected to the first reference unit 511 and the second reference unit 521.

The spacing member 516 enables the first reference unit 511 and the second reference unit 521 being spaced from each other by a predetermined distance.

Furthermore, the spacing member 516, the first reference unit 511 and the second reference unit 521 may be integrally formed and, in this case, they form a "⊏" shape.

The oil detection device may further include a reference terminal 517 electrically and mechanically connected to the spacing member 516.

The reference terminal 517 protrudes outside from a portion of the spacing member 516. That is, the reference terminal 517 may be integrally formed with the spacing member 516.

In addition, the reference terminal 517 is electrically and mechanically connected to the first connection terminal 541 of the connection unit.

The reference terminal 517 transfers an input signal from the first connection terminal 541 of the connection unit to the first reference unit 511 and the second reference unit 521.

Furthermore, a distance d between the first reference unit 511 and the first base unit 512, a distance d between the first reference unit 511 and the first augmenting unit 513, a distance d between the second reference unit 521 and the second base unit 522, and a distance d between the second reference unit 521 and the second augmenting unit 523 may be identical or different.

The first reference unit 511 and the second reference unit 521 corresponding to the reference electrodes input an input signal from the control unit 610 and the first base unit 512 and the second base unit 522 output a detection signal.

Figure 6:
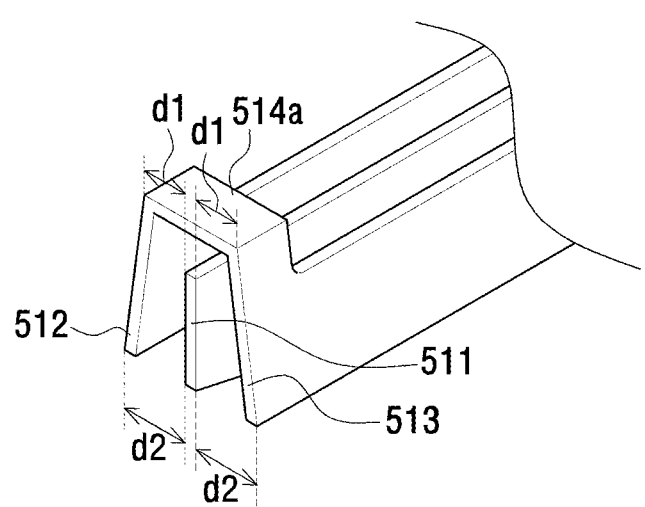
FIG. 6 is another exemplary view illustrating the first detection unit and the second detection unit provided in the oil detection device according to the embodiment.

FIG. 6 is a view illustrating an example of an oil detection device according to another embodiment.

Only configurations of the first detection unit and the second detection unit different from the oil detection device shown in FIG. 4 will be described below.

The first detection unit 510 includes the first reference unit 511 corresponding to the reference electrode and the first base unit 512 and the first augmenting unit 513 corresponding to the detection electrodes.

The first base unit 512 and the first augmenting unit 513 are disposed at both sides of the first reference unit 511 such that the first reference unit 511 is interposed therebetween.

The first base unit 512 and the first augmenting unit 513 have the same size. That is, the first base unit 512 and the first augmenting unit 513 are formed in a plate shape, the width and length of the first base unit 512 are the same as those of the first augmenting unit 513, and the first base unit 512 and the first augmenting unit 513 have the same area.

Furthermore, the first reference unit 511 may also have a plate shape and have the same size as the first base unit 512.

The first base unit 512 and the first augmenting unit 513 may be symmetrical to each other based on the first reference unit 511, but surfaces constituting the first base unit 512 and the first augmenting unit 513 are nonparallel to each other.

More specifically, a first distance d1 between an end of the first reference unit 511 and an end of the first base unit 512 adjacent to the end of the first reference unit 511 is different from a second distance d2 between the other end of the first reference unit 511 and the other end of the first base unit 512 adjacent to the first reference unit 511. That is, the first distance is less than the second distance.

In addition, a first distance d1 between an end of the first reference unit 511 and an end of the first augmenting unit 513 adjacent to the end of the first reference unit 511 is different from a second distance d2 between the other end of the first reference unit 511 and the other end of the first augmenting unit 513 adjacent to the first reference unit 511. That is, the first distance is less than the second distance.

That is, the distance between the first reference unit and the first base unit when the first reference unit is interposed between the first base unit and the first augmenting unit increases from one side to the other side of the first reference unit, and the distance between the first reference unit and the first augmenting unit when the first reference unit is interposed between the first base unit and the first augmenting unit increases from one side to the other side of the first reference unit.

The first detection unit 510 has a cross-section having a trapezoidal shape and the first base unit 512 has a predetermined inclination based on the first reference unit 511. In addition, the first augmenting unit 513 has a predetermined inclination based on the first reference unit 511.

That is, the first base unit 512 and the first augmenting unit 513 surround the first reference unit 511, and the first reference unit, the first base unit and the first augmenting unit are disposed such that opposite surfaces thereof are nonparallel to one another.

By disposing the first base unit 512 and the first augmenting unit 513 at both sides of the first reference unit 511, capacitance generated by the first detection unit 510 is increased and detection accuracy of oil is thus improved.

In addition, the first base unit and the first augmenting unit have a predetermined inclination based on the first reference unit, thus preventing oil accumulation between the first reference unit 511, the first base unit 512 and the first augmenting unit 513.

The second detection unit 520 also has the same structure as the first detection unit 510.

The second detection unit 520 includes a second reference unit 521 corresponding to a reference electrode and a second base unit 522 and a second augmenting unit 523 corresponding to detection electrodes.

The second base unit 522 and the second augmenting unit 523 are disposed at both sides of the second reference unit 521 such that the second reference unit 521 is interposed therebetween.

The second base unit 522 and the second augmenting unit 523 have the same size. That is, the second base unit 522 and the second augmenting unit 523 are formed in a plate shape, the width and length of the second base unit 522 are the same as those of the second augmenting unit 523, and the second base unit 522 and the second augmenting unit 523 have the same area.

Furthermore, the second reference unit 521 also has a plate shape and has the same size as the second base unit 522.

The second base unit 522 and the second augmenting unit 523 are symmetrical to each other based on the second reference unit 521, but are disposed such that surfaces thereof are nonparallel to each other.

More specifically, a first distance d1 between an end of the second reference unit and an end of the second base unit adjacent to the end of the second reference unit is different from a second distance d2 between the other end of the second reference unit and the other end of the second base unit adjacent to the second reference unit. That is, the first distance is less than the second distance.

In addition, a first distance d1 between an end of the second reference unit and an end of the second augmenting unit adjacent to the end of the second reference unit is different from a second distance d2 between the other end of the second reference unit and the other end of the second augmenting unit adjacent to the second reference unit. That is, the first distance is less than the second distance.

That is, the distance between the second reference unit and the second base unit when the second reference unit is interposed between the second base unit and the second augmenting unit increases from one side to the other side of the second reference unit, and the distance between the second reference unit and the second augmenting unit when the second reference unit is interposed between the second base unit and the second augmenting unit increases from one side to the other side of the second reference unit.

The second detection unit has a cross-section having a trapezoidal shape and the second base unit 522 has a predetermined inclination based on the second reference unit 521. In addition, the second augmenting unit 513 has a predetermined inclination based on the second reference unit 521.

That is, the second base unit 522 and the second augmenting unit 523 surround the second reference unit 521, and the second reference unit, the second base unit and the second augmenting unit are disposed such that opposite surfaces thereof are nonparallel to one another.

By disposing the second base unit 522 and the second augmenting unit 523 at both sides of the second reference unit 521, capacitance generated by the second detection unit 520 is increased and detection accuracy of oil is thus improved.

In addition, the second base unit and the second augmenting unit have a predetermined inclination based on the second reference unit, thus preventing oil accumulation between the second reference unit, the second base unit and the second augmenting unit.

Figure 7:
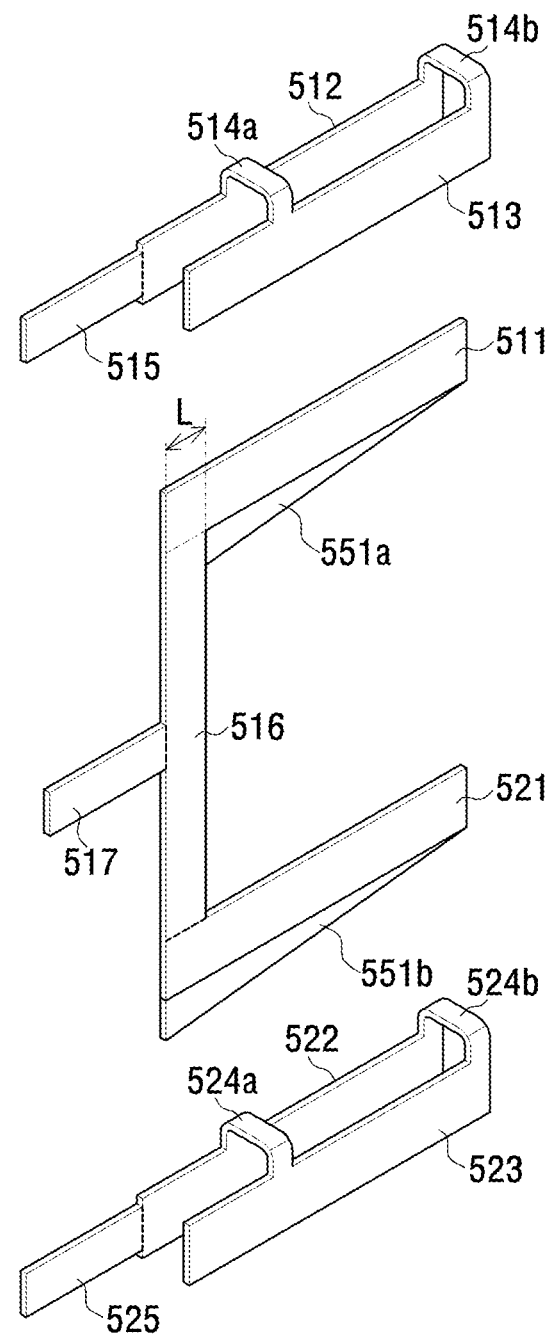
FIG. 7 is another exemplary view illustrating the first detection unit and the second detection unit provided in the oil detection device according to the embodiment.

FIG. 7 is a view illustrating an example of an oil detection device according to another embodiment and the oil detection device 500 according to the present embodiment further includes a flow unit 550 (551*a* or 551*b*).

An example of the flow unit of the oil detection device will be described with reference to FIGS. 7 to 10. Furthermore, different reference numerals are used according to examples of the flow unit.

As shown in FIG. 7, the first detection unit 510 includes a first reference unit 511 corresponding to a reference electrode and a first base unit 512 and a first augmenting unit 513 corresponding to detection electrodes.

The first base unit 512 and the first augmenting unit 513 are disposed at both sides of the first reference unit 511 such that the first reference unit 511 is interposed therebetween and are each spaced from the first reference unit 511 by a predetermined distance d.

The first base unit 512 and the first augmenting unit 513 are symmetrical to each other based on the first reference unit 511 and have the same size.

That is, the first base unit 512 and the first augmenting unit 513 are formed in a plate shape, the width and length of the first base unit 512 are the same as those of the first augmenting unit 513, and the first base unit 512 and the first augmenting unit 513 have the same area.

Figure 5:
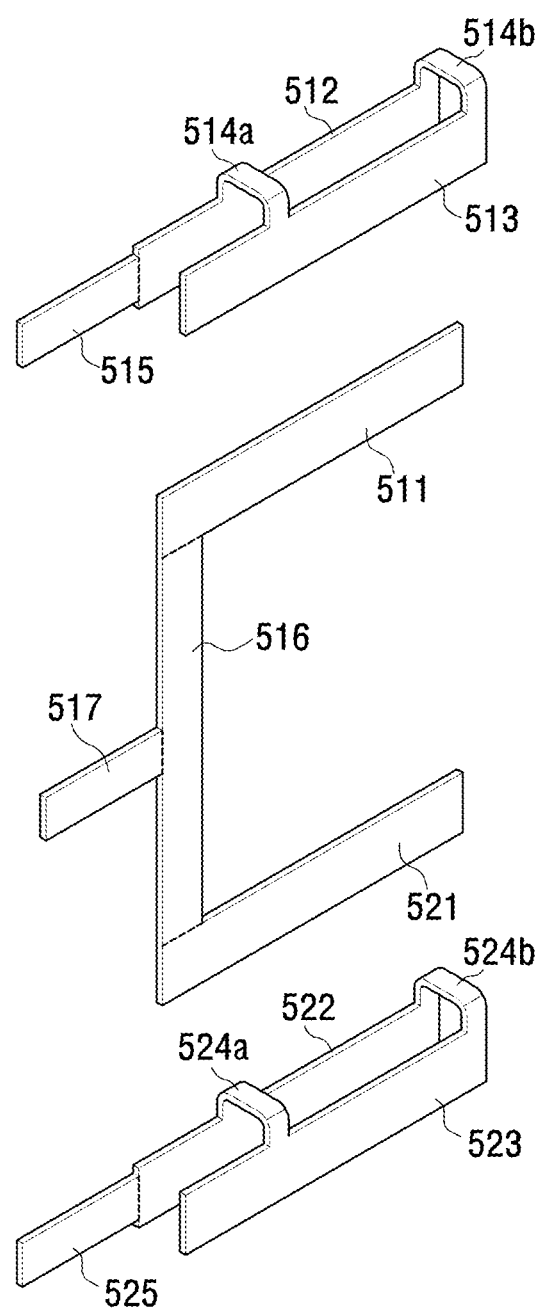
FIG. 5 is an exemplary exploded view illustrating the first detection unit and the second detection unit provided in the oil detection device according to the embodiment.

The first reference unit 511, the first base unit 512 and the first augmenting unit 513 may be disposed such that surfaces thereof are parallel or nonparallel to one another (see FIGS. 5 and 6).

The first base unit 512 and the first augmenting unit 513 corresponding to the detection electrode are the same as the first base unit 512 and the first augmenting unit 513 shown in FIGS. 5 and 6 and a detailed explanation thereof is thus omitted.

In addition, an explanation of the spacing member 516 and the reference terminal 517 is omitted.

The first detection unit 510 further includes a first flow unit 551*a* to enable an oil to flow and thereby prevent oil accumulation.

The first flow unit 551*a* is integrally disposed at a side surface of the first reference unit 511.

The side surface is a bottom surface of the first detection unit which faces the bottom of the compressor among surfaces of the first reference unit of the first detection unit when the oil detection device is mounted on the compressor.

The first flow unit 551*a* may have a right-angled triangular plate shape. That is, a side surface of the first flow unit 551*a* has a predetermined inclination from one end to the other end of the first reference unit.

More specifically, a surface corresponding to the bottom of the first flow unit 551*a* is adjacent to a bottom surface of the first reference unit 511, a surface corresponding to a height of the first flow unit 551*a* is adjacent to the spacing member 516 and a surface corresponding to a hypotenuse of the first flow unit 551*a* is exposed to the outside.

Furthermore, the first flow unit 551*a* extends in the direction of gravity, i.e., in a lower side direction, from the bottom surface of the first reference unit.

Oil flows downward along the first flow unit 551*a* which protrudes from the first reference unit 511 while having a predetermined inclination, thereby preventing oil from accumulating on the first detection unit.

In addition, the first base unit 512 and the first augmenting unit 513 are disposed at both sides of the first reference unit 511, thereby increasing capacitance generated by the first detection unit 510 and improving detection accuracy of oil.

The second detection unit 520 includes a second reference unit 521 corresponding to a reference electrode and a second base unit 522 and a second augmenting unit 523 corresponding to detection electrodes.

The second base unit 522 and the second augmenting unit 523 are disposed at both sides of the second reference unit 521 such that the second reference unit 521 is interposed therebetween, and the second base unit 522 and the second augmenting unit 523 are spaced from the second reference unit 521 by a predetermined distance.

The second base unit 522 and the second augmenting unit 523 are symmetrical to each other based on the second reference unit 521 and have the same size.

That is, the second base unit 522 and the second augmenting unit 523 are formed in a plate shape, the width and length of the second base unit 522 are the same as those of the second augmenting unit 523, and the second base unit 522 and the second augmenting unit 523 have the same area.

The second reference unit 521, the second base unit 522 and the second augmenting unit 523 may be disposed such that surfaces thereof are parallel or nonparallel to one another (see FIGS. 5 and 6).

The second base unit 522 and the second augmenting unit 523 corresponding to detection electrodes are the same as the second base unit 522 and the second augmenting unit 523 shown in FIGS. 5 and 6 and a detailed explanation thereof is thus omitted.

The second detection unit 520 further includes a second flow unit 551b to enable an oil to flow and thereby prevent oil accumulation.

The second flow unit 551b is integrally disposed at a side surface of the second reference unit 521.

The side surface is a bottom surface of the second detection unit which faces the bottom of the compressor among surfaces of the second reference unit of the second detection unit when the oil detection device is mounted on the compressor.

The second flow unit 551b is formed in a right-angled triangular plate shape. That is, a side surface of the second flow unit 551b has a predetermined inclination from one end to the other end of the second reference unit.

More specifically, a surface corresponding to the bottom of the second flow unit 551b is adjacent to a bottom surface of the second reference unit 521, and a surface corresponding to a height of the second flow unit 551b and a surface corresponding to a hypotenuse of the second flow unit 551b are exposed to the outside.

Furthermore, the second flow unit 551b extends in the direction of gravity, i.e., in a lower side direction, from the bottom surface of the second reference unit.

The first flow unit 551a and the second flow unit 551b may have the same shape and size. In addition, according to disposition and configurations with the first reference unit, the second reference unit and the spacing member, the first flow unit 551a may have a smaller size than the second flow unit 551b.

This will be described in more detail later.

Because the spacing member 516 contacts the bottom surface of the first reference unit 511, a length of the bottom surface of the first reference unit 511 is smaller than a length of the bottom surface of the second reference unit 521 by a contact length L.

The first flow unit 551a is disposed on the bottom surface of the first reference unit 511 and the second flow unit 551b is disposed on the bottom surface of the second reference unit 521. Because the length of the first reference unit 511 is smaller than the length of the second reference unit 521 by the contact length L, a length of the bottom of the first flow unit 551a is smaller than a length of the bottom of the second flow unit 551b by the contact length L.

Furthermore, the height of the first flow unit 551a may be the same as or different from the height of the second flow unit 551b.

Oil flows downward along the second flow unit which protrudes from the second reference unit while having a predetermined inclination, thereby preventing oil from accumulating on the second detection unit.

In addition, the second base unit 522 and the second augmenting unit 523 are disposed at both sides of the second reference unit 521, thereby increasing capacitance generated by the second detection unit 520 and improving detection accuracy of the oil.

Figure 8:
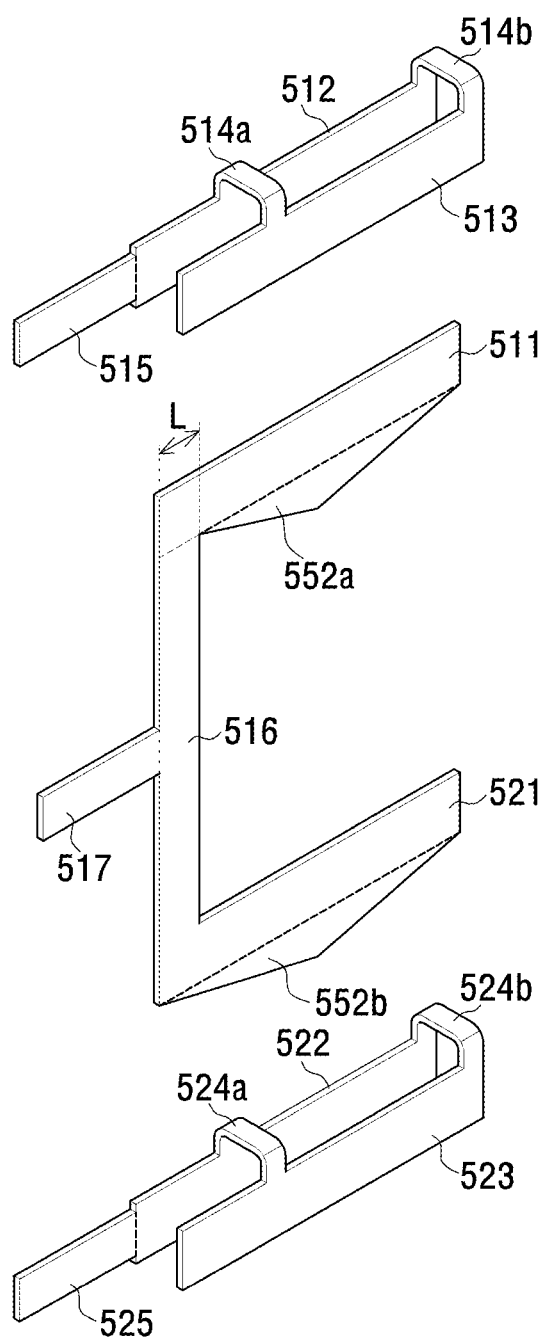
FIG. 8 is another exemplary view illustrating the first detection unit and the second detection unit provided in the oil detection device according to the embodiment.

FIG. 8 is a view illustrating an example of an oil detection device according to another embodiment. The oil detection device 500 according to the present embodiment further includes a flow unit 550 (552a or 552b).

As shown in FIG. 8, the first detection unit 510 includes a first reference unit 511 corresponding to a reference electrode and a first base unit 512 and a first augmenting unit 513 corresponding to detection electrodes.

The first base unit 512 and the first augmenting unit 513 are disposed at both sides of the first reference unit 511 such that the first reference unit 511 is interposed therebetween and are spaced from the first reference unit 511 by a predetermined distance.

The first base unit 512 and the first augmenting unit 513 are symmetrical to each other based on the first reference unit 511 and have the same size.

That is, the first base unit 512 and the first augmenting unit 513 are formed in a plate shape, the width and length of the first base unit 512 are the same as those of the first augmenting unit 513, and the first base unit 512 and the first augmenting unit 513 have the same area.

The first reference unit 511, the first base unit 512 and the first augmenting unit 513 may be disposed such that surfaces thereof are parallel or nonparallel to one another. Furthermore, nonparallel disposition of the first reference unit 511, the first base unit 512 and the first augmenting unit 513 will be described later with reference to FIG. 9.

The first base unit 512 and the first augmenting unit 513 corresponding to detection electrodes are the same as the first base unit 512 and the first augmenting unit 513 shown in FIGS. 5 and 6 and a detailed explanation thereof is thus omitted.

In addition, an explanation of the spacing member 516 and the reference terminal 517 is omitted.

The first detection unit 510 further includes a first flow unit 552a to enable an oil to flow and thereby prevent oil accumulation.

The first flow unit 552a is integrally disposed at a side surface of the first reference unit 511.

The side surface is a bottom surface of the first detection unit which faces the bottom of the compressor among surfaces of the first reference unit of the first detection unit when the oil detection device is mounted on the compressor.

The first flow unit 552a has a predetermined inclination from both sides to the center of the first reference unit 511. That is, the first flow unit 552a has an isosceles-triangle plate shape.

More specifically, a surface corresponding to the bottom surface of the first flow unit 552a is adjacent to the bottom surface of the first reference unit 511 and a vertex of the first flow unit 552a is disposed at a position spaced from the first reference unit 511 by a predetermined distance.

That is, the vertex of the first flow unit 552a may be disposed at a position spaced from the center of the exposed bottom surface of the first reference unit.

In addition, the vertex of the first flow unit 552a may be disposed at a position spaced by a predetermined distance from a point of the exposed bottom surface of the first reference unit. That is, the first flow unit 552a may have an equilateral-triangle plate shape.

Furthermore, the first flow unit 552a extends in the direction of gravity, i.e., in a lower side direction, from the bottom surface of the first reference unit.

Oil flows downward along the first flow unit 552a which protrudes from the first reference unit 511 while having a predetermined inclination, thereby preventing accumulation of oil on the first detection unit.

As described above, oil flows downward along the first flow unit 551a which protrudes from the first reference unit 511 while having a predetermined inclination, thereby preventing accumulation of oil on the first detection unit.

The second detection unit 520 includes a second reference unit 521 corresponding to a reference electrode and a second base unit 522 and a second augmenting unit 523 corresponding to detection electrodes.

The second base unit 522 and the second augmenting unit 523 are disposed at both sides of the second reference unit 521 such that the second reference unit 521 is interposed therebetween, and are spaced from the second reference unit 521 by a predetermined distance.

The second base unit 522 and the second augmenting unit 523 are symmetrical to each other based on the second reference unit 521 and have the same size.

That is, the second base unit 522 and the second augmenting unit 523 are formed in a plate shape, the width and length of the second base unit 522 are the same as those of the second augmenting unit 523, and the second base unit 522 and the second augmenting unit 523 have the same area.

The second reference unit 521, the second base unit 522 and the second augmenting unit 523 may be disposed such that surfaces thereof are parallel or nonparallel to one another (see FIGS. 5 and 6).

Furthermore, nonparallel disposition of the second reference unit 521, the second base unit 522 and the second augmenting unit 523 will be described later with reference to FIG. 9.

The second base unit 522 and the second augmenting unit 523 corresponding to detection electrodes are the same as the second base unit 522 and the second augmenting unit 523 shown in FIGS. 5 and 6 and a detailed explanation thereof is thus omitted.

The second detection unit 520 further includes a second flow unit 552b to enable an oil to flow and thereby prevent oil accumulation.

The second flow unit 552b is integrally disposed at a side surface of the second reference unit 521.

The side surface is a bottom surface of the second detection unit which faces the bottom of the compressor among surfaces of the second reference unit of the second detection unit when the oil detection device is mounted on the compressor.

The second flow unit 552b has a predetermined inclination from both sides to the center of the second reference unit 521. That is, the second flow unit 552b has an isosceles-triangle plate shape.

More specifically, a surface corresponding to the bottom surface of the second flow unit 552b is adjacent to the bottom surface of the second reference unit 521 and a vertex of the second flow unit 552b is disposed at a position spaced from the second reference unit 521 by a predetermined distance.

That is, the vertex of the second flow unit 552b may be disposed at a position spaced from the center of the exposed bottom surface of the second reference unit.

In addition, the vertex of the second flow unit 552b may be disposed at a position spaced by a predetermined distance from a point of the exposed bottom surface of the second reference unit. That is, the second flow unit 552b may have an equilateral-triangle plate shape.

Furthermore, the second flow unit 552b extends in the direction of gravity, i.e., in a lower side direction, from the bottom surface of the second reference unit.

The first flow unit 552a and the second flow unit 552b may have the same shape and size. In addition, the first flow unit 552a may have a size smaller than the second flow unit 552b according to dispositions and configurations with the first reference unit, the second reference unit and the spacing member 516.

This will be described in more detail.

Because the spacing member 516 contacts the bottom surface of the first reference unit 511, a length of the bottom surface of the first reference unit 511 is smaller than a length of the bottom surface of the second reference unit 521 by a contact length L.

The first flow unit 552a is disposed on the bottom surface of the first reference unit 511 and the second flow unit 552b is disposed on the bottom surface of the second reference unit 521. Because the length of the first reference unit 511 is smaller than the length of the second reference unit 521 by the contact length L, a length of the bottom of the first flow unit 552a is smaller than a length of the bottom of the second flow unit 552b by the contact length L.

Furthermore, the height of the first flow unit 552a may be the same as or different from the height of the second flow unit 552b.

As described above, oil flows downward along the second flow unit which protrudes from the second reference unit while having a predetermined inclination, thereby preventing accumulation of oil on the second detection unit and reducing oil discharge time.

Figure 9:
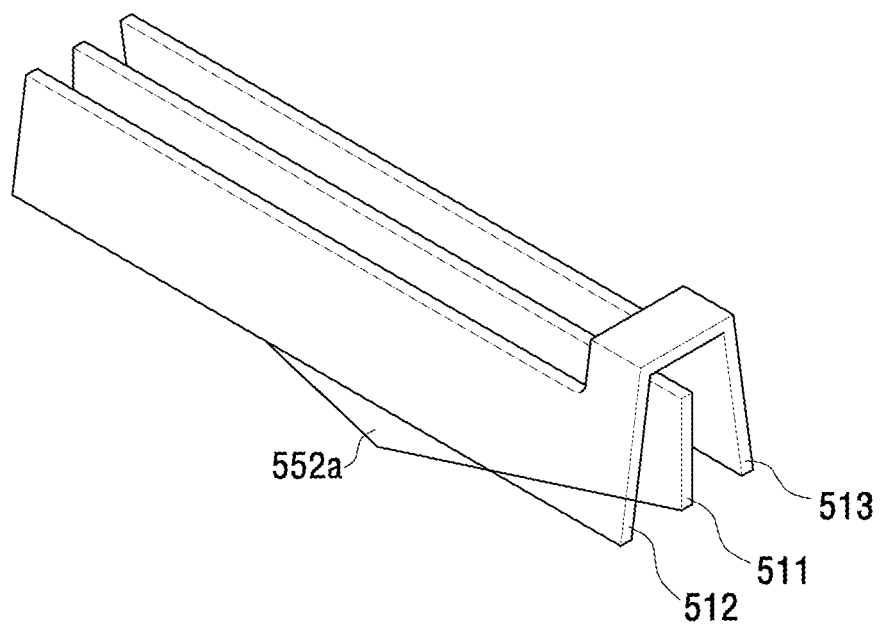
FIG. 9 is another exemplary view illustrating the first detection unit and the second detection unit provided in the oil detection device according to the embodiment.

FIG. 9 is a view illustrating an example of an oil detection device according to another embodiment. The oil detection device 500 according to the present embodiment further includes a flow unit 550 (552a or 552b).

The oil detection device including a flow unit 550 (552a or 552b) shown in FIG. 9 will be described below.

The first detection unit 510 includes a first reference unit 511 corresponding to a reference electrode and a first base unit 512 and a first augmenting unit 513 corresponding to detection electrodes.

The first base unit 512 and the first augmenting unit 513 are disposed at both sides of the first reference unit 511 such that the first reference unit 511 is interposed therebetween and are spaced from the first reference unit 511 by a predetermined distance.

The first base unit 512 and the first augmenting unit 513 have the same size. That is, the first base unit 512 and the first augmenting unit 513 are formed in a plate shape, the width and length of the first base unit 512 are the same as those of the first augmenting unit 513, and the first base unit 512 and the first augmenting unit 513 have the same area.

Furthermore, the first reference unit 511 is also formed in a plate shape and have the same size as the first base unit 512.

The first base unit 512 and the first augmenting unit 513 are symmetrical to each other based on the first reference unit 511, but surfaces thereof are nonparallel to one another.

More specifically, a first distance d1 between an end of the first reference unit 511 and an end of the first base unit 512 adjacent to the end of the first reference unit 511 is different from a second distance d2 between the other end of the first reference unit 511 and the other end of the first base unit 512 adjacent to the first reference unit. That is, the first distance is less than the second distance.

In addition, a first distance d1 between an end of the first reference unit 511 and an end of the first augmenting unit 513 adjacent to the end of the first reference unit 511 is different from a second distance d2 between the other end of the first reference unit 511 and the other end of the first augmenting unit 513 adjacent to the first reference unit. That is, the first distance is less than the second distance.

That is, the distance between the first reference unit and the first base unit when the first reference unit is interposed between the first base unit and the first augmenting unit increases from one side to the other side of the first reference unit, and the distance between the first reference unit and the first augmenting unit when the first reference unit is interposed between the first base unit and the first augmenting unit increases from one side to the other side of the first reference unit.

The first detection unit 510 has a cross-section having a trapezoidal shape and the first base unit 512 has a predetermined inclination based on the first reference unit 511. In addition, the first augmenting unit 513 has a predetermined inclination based on the first reference unit 511.

The first detection unit 510 further includes a first flow unit 552a to enable an oil to flow and thereby prevent oil accumulation.

The first flow unit 552a is integrally disposed at a side surface of the first reference unit 511.

The side surface is a bottom surface of the first detection unit which faces the bottom of the compressor among surfaces of the first reference unit of the first detection unit when the oil detection device is mounted on the compressor.

The first flow unit 552a has a predetermined inclination from both sides to the center of the first reference unit 511. That is, the first flow unit 552a has an isosceles-triangle plate shape.

More specifically, a surface corresponding to the bottom surface of the first flow unit 552a is adjacent to the bottom surface of the first reference unit 511 and a vertex of the first flow unit 552a is disposed at a position spaced from the first reference unit 511 by a predetermined distance.

That is, the vertex of the first flow unit 552a may be disposed at a position spaced from the center of the exposed bottom surface of the first reference unit.

In addition, the vertex of the first flow unit 552a may be disposed at a position spaced by a predetermined distance from a point of the exposed bottom surface of the first reference unit. That is, the first flow unit 552a may have an equilateral-triangle plate shape.

Furthermore, the first flow unit 552a extends in the direction of gravity, i.e., in a lower side direction, from the bottom surface of the first reference unit.

By disposing the first base unit 512 and the first augmenting unit 513 at both sides of the first reference unit 511 as described above, capacitance generated by the first detection unit 510 is increased and detection accuracy of oil is thus improved.

In addition, the first base unit and the first augmenting unit have a predetermined inclination based on the first reference unit, thereby preventing oil accumulation between the first reference unit 511, the first base unit 512 and the first augmenting unit 513.

The second detection unit 520 also has the same structure as the first detection unit 510.

The second detection unit 520 includes a second reference unit 521 corresponding to a reference electrode and a second base unit 522 and a second augmenting unit 523 corresponding to detection electrodes.

The second base unit 522 and the second augmenting unit 523 are disposed at both sides of the second reference unit 521 such that the second reference unit 521 is interposed therebetween.

The second base unit 522 and the second augmenting unit 523 have the same size. That is, the second base unit 522 and the second augmenting unit 523 are formed in a plate shape, the width and length of the second base unit 522 are the same as those of the second augmenting unit 523, and the second base unit 522 and the second augmenting unit 523 have the same area.

Furthermore, the second reference unit 521 is also formed in a plate shape and has the same size as the second base unit 522.

The second base unit 522 and the second augmenting unit 523 are symmetrical to each other based on the second reference unit 521, but are disposed such that surfaces thereof are nonparallel to each other.

More specifically, a first distance d1 between an end of the second reference unit and an end of the second base unit adjacent to the end of the second reference unit is different from a second distance d2 between the other end of the second reference unit and the other end of the second base unit adjacent to the second reference unit. That is, the first distance is less than the second distance.

In addition, a first distance d1 between an end of the second reference unit and an end of the second augmenting unit adjacent to the end of the second reference unit is different from a second distance d2 between the other end of the second reference unit and the other end of the second augmenting unit adjacent to the second reference unit. That is, the first distance is less than the second distance.

That is, the distance between the second reference unit and the second base unit when the second reference unit is interposed between the second base unit and the second augmenting unit increases from one side to the other side of the second reference unit, and the distance between the second reference unit and the second augmenting unit when the second reference unit is interposed between the second base unit and the second augmenting unit increases from one side to the other side of the second reference unit.

The second detection unit has a cross-section having a trapezoidal shape and the second base unit 522 has a predetermined inclination based on the second reference unit 521. In addition, the second augmenting unit 523 has a predetermined inclination based on the second reference unit 521.

The second detection unit 520 further includes a second flow unit 552b to enable an oil to flow and thereby prevent oil accumulation.

The second flow unit 552b is integrally disposed at a side surface of the second reference unit 521.

The side surface is a bottom surface of the second detection unit which faces the bottom of the compressor among surfaces of the second reference unit of the second detection unit when the oil detection device is mounted on the compressor.

The second flow unit 552b has a predetermined inclination from both sides to the center of the second reference unit 521. That is, the second flow unit 552b has an isosceles-triangle plate shape.

More specifically, a surface corresponding to the bottom surface of the second flow unit 552b is adjacent to the bottom surface of the second reference unit 521 and a vertex of the second flow unit 552b is disposed at a position spaced from the second reference unit 521 by a predetermined distance.

That is, the vertex of the second flow unit 552b may be disposed at a position spaced from the center of the exposed bottom surface of the second reference unit.

In addition, the vertex of the second flow unit 552b may be disposed at a position spaced by a predetermined distance from a point of the exposed bottom surface of the second reference unit. That is, the second flow unit 552b may have an equilateral-triangle plate shape.

Furthermore, a surface corresponding to the hypotenuse of the first flow unit and the second flow unit may be formed in a curved line or arch shape.

Furthermore, the second flow unit 552b extends in the direction of gravity, i.e., in a lower side direction, from the bottom surface of the second reference unit.

The first flow unit 552a and the second flow unit 552b may have the same shape and size. In addition, the first flow unit 552a may be smaller than the second flow unit 552b according to dispositions and configurations with the first reference unit, the second reference unit and the spacing member 516.

This will be described in more detail.

Because the spacing member 516 contacts the bottom surface of the first reference unit 511, a length of the bottom surface of the first reference unit 511 is smaller than a length of the bottom surface of the second reference unit 521 by a contact length L.

The first flow unit 552a is disposed on the bottom surface of the first reference unit 511 and the second flow unit 552b is disposed on the bottom surface of the second reference unit 521. Because the length of the first reference unit 511 is smaller than the length of the second reference unit 521 by the contact length L, a length of the bottom of the first flow unit 552a is smaller than a length of the bottom of the second flow unit 552b by the contact length L.

Furthermore, the height of the first flow unit 552a may be the same as or different from the height of the second flow unit 552b.

By disposing the second base unit 522 and the second augmenting unit 523 at both sides of the second reference unit 521 as described above, capacitance generated by the second detection unit 520 is increased and detection accuracy of oil is thus improved.

In addition, the second base unit and the second augmenting unit have a predetermined inclination based on the second reference unit, thus preventing oil accumulation between the second reference unit, the second base unit and the second augmenting unit.

Figure 10:
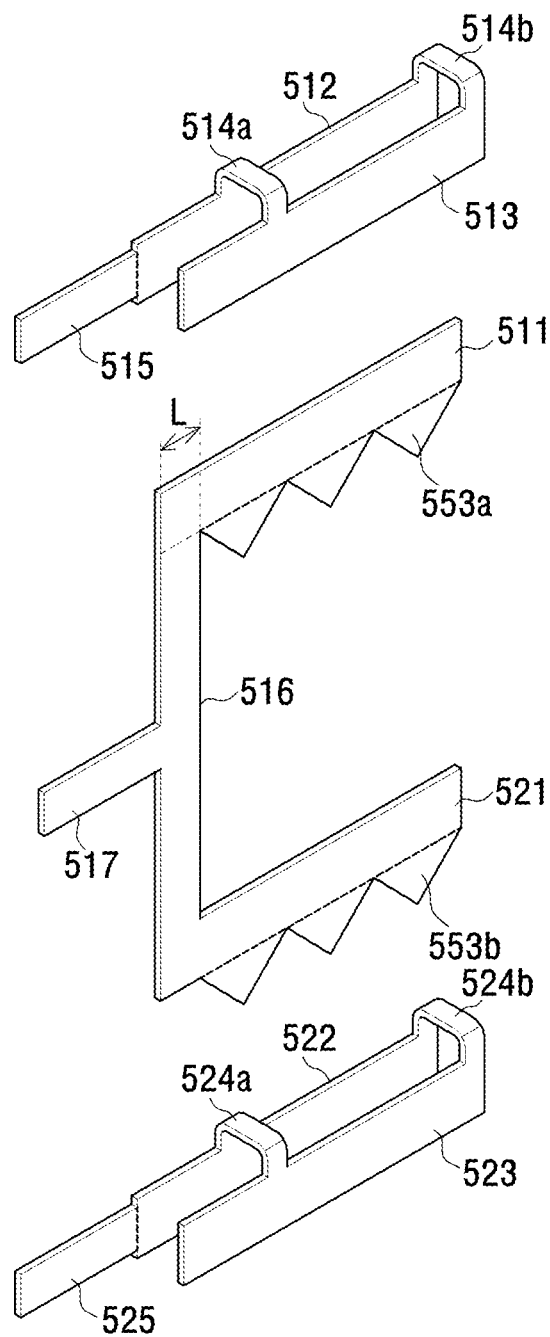
FIG. 10 is another exemplary view illustrating the first detection unit and the second detection unit provided in the oil detection device according to the embodiment.

FIG. 10 is a view illustrating an example of an oil detection device according to another embodiment. The oil detection device 500 according to the present embodiment further includes at least one flow unit 550 (553a or 553b).

As shown in FIG. 10, the first detection unit 510 includes a first reference unit 511 corresponding to a reference electrode and a first base unit 512 and a first augmenting unit 513 corresponding to detection electrodes.

The first base unit 512 and the first augmenting unit 513 are disposed at both sides of the first reference unit 511 such that the first reference unit 511 is interposed therebetween and are spaced from the first reference unit 511 by a predetermined distance.

The first base unit 512 and the first augmenting unit 513 are symmetrical to each other based on the first reference unit 511 and have the same size.

That is, the first base unit 512 and the first augmenting unit 513 are formed in a plate shape, the width and length of the first base unit 512 are the same as those of the first augmenting unit 513, and the first base unit 512 and the first augmenting unit 513 have the same area.

The first reference unit 511, the first base unit 512 and the first augmenting unit 513 may be disposed such that surfaces thereof are parallel or nonparallel to one another (see FIGS. 5 and 6).

The first base unit 512 and the first augmenting unit 513 corresponding to detection electrodes are the same as the first base unit 512 and the first augmenting unit 513 shown in FIGS. 5 and 6 and a detailed explanation thereof is thus omitted.

In addition, an explanation of the spacing member 516 and the reference terminal 517 is omitted.

The first detection unit 510 further includes a first flow unit 553a to enable an oil to flow and thereby prevent oil accumulation.

The first flow unit 553a is integrally disposed at a side surface of the first reference unit 511.

The side surface is a bottom surface of the first detection unit which faces the bottom of the compressor among surfaces of the first reference unit of the first detection unit when the oil detection device is mounted on the compressor.

The first flow unit 553a is formed in a saw-tooth plate shape formed by continuously disposing a plurality of triangular plate shapes.

The triangles may be identical or different.

Furthermore, the first flow unit 553a irregularly extends in the direction of gravity, i.e., in a lower side direction, from the bottom surface of the first reference unit.

Oil flows downward along the first flow unit as described above, thereby preventing accumulation of oil on the first detection unit.

The second detection unit 520 includes a second reference unit 521 corresponding to a reference electrode and a second base unit 522 and a second augmenting unit 523 corresponding to detection electrodes.

The second base unit 522 and the second augmenting unit 523 are disposed at both sides of the second reference unit 521 such that the second reference unit 521 is interposed therebetween, and the second base unit 522 and the second augmenting unit 523 are spaced from the second reference unit 521 by a predetermined distance.

The second base unit 522 and the second augmenting unit 523 are symmetrical to each other based on the second reference unit 521 and have the same size.

That is, the second base unit 522 and the second augmenting unit 523 are formed in a plate shape, the width and length of the second base unit 522 are the same as those of the second augmenting unit 523, and the second base unit 522 and the second augmenting unit 523 have the same area.

The second reference unit 521, the second base unit 522 and the second augmenting unit 523 may be disposed such that surfaces thereof are parallel or nonparallel to one another (see FIGS. 5 and 6).

The second base unit 522 and the second augmenting unit 523 corresponding to detection electrodes are the same as the second base unit 522 and the second augmenting unit 523 shown in FIGS. 5 and 6 and a detailed explanation thereof is thus omitted.

The second detection unit 520 further includes a second flow unit 553b to enable an oil to flow and thereby prevent oil accumulation.

The second flow unit 553b is integrally disposed at a side surface of the second reference unit 521.

The side surface is a bottom surface of the second detection unit which faces the bottom of the compressor among surfaces of the second reference unit of the second detection unit when the oil detection device is mounted on the compressor.

The second flow unit 553b is formed in a saw-tooth plate shape formed by continuously disposing a plurality of triangular plate shapes.

The triangles may be identical or different.

Furthermore, the second flow unit 553b irregularly extends in the direction of gravity, i.e., in a lower side direction, from the bottom surface of the second reference unit.

The first flow unit 553a and the second flow unit 553b may have the same shape and size. In addition, according to disposition and configurations with the first reference unit, the second reference unit and the spacing member 516, the tooth of the first flow unit 553a has a size smaller than the tooth of the second flow unit 553b, or the number of teeth of the first flow unit 553a is smaller than that of the second flow unit 553b.

This will be described in more detail.

Because the spacing member 516 contacts the bottom surface of the first reference unit 511, a length of the bottom surface of the first reference unit 511 is smaller than a length of the bottom surface of the second reference unit 521 by a contact length L.

The first flow unit 553a is disposed on the bottom surface of the first reference unit 511 and the second flow unit 553b is disposed on the bottom surface of the second reference unit 521. Because the length of the first reference unit 511 is smaller than the length of the second reference unit 521 by the contact length L, the size of teeth disposed on the bottom of the first reference unit 511 is smaller than the size of teeth disposed on the bottom of the second reference unit.

In addition, assuming that the tooth size of the first flow unit 553a is the same as that of the second flow unit 553b, the number of the teeth of the first flow unit 553a may be smaller than the number of the teeth of the second flow unit 553b.

As such, prevention of accumulation of oil on the first detection unit 510 and the second detection unit 520 is maximized by using the nonparallel structure between the electrodes in conjunction with the tooth structure.

Figure 11:
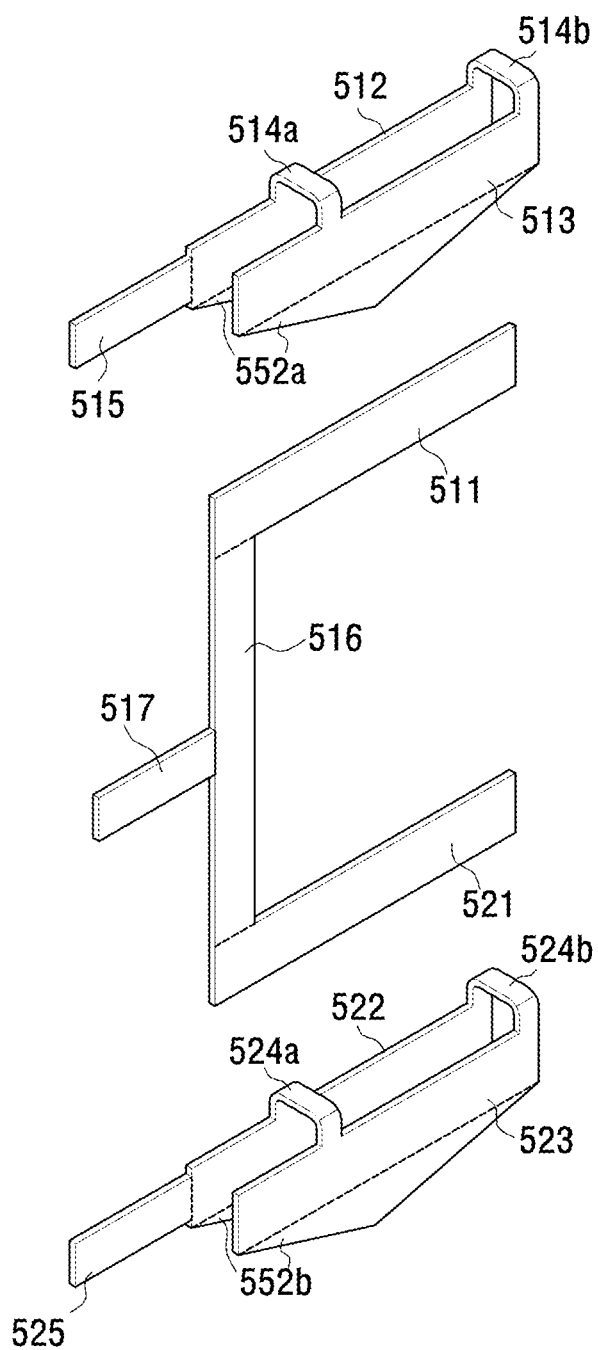
FIG. 11 is another exemplary view illustrating the first detection unit and the second detection unit provided in the oil detection device according to the embodiment.

Although the flow unit provided in the oil detection device shown in FIGS. 7 to 11 is provided in all of the first and second reference units, the flow unit may be provided in any one of the first and second reference units and may be provided in at least one of the first base unit, the first augmenting unit, the second base unit and the second augmenting unit, as shown in FIG. 11.

Figure 12:
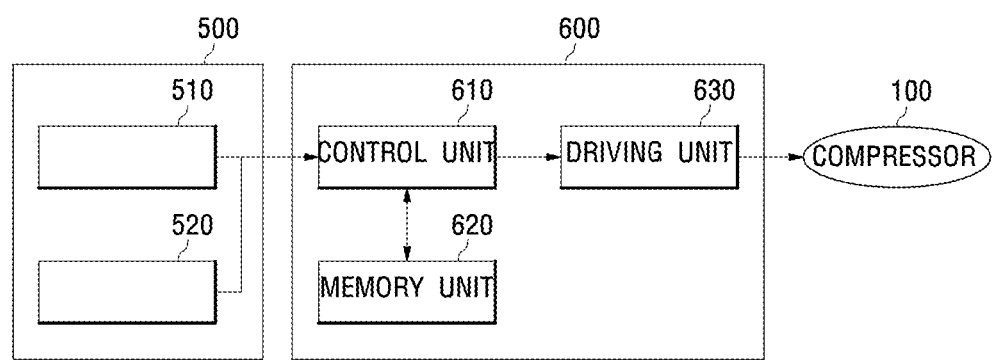
FIG. 12 is a view illustrating a compressor provided with an oil detection device according to an embodiment.

FIG. 12 is a view illustrating a configuration of a compressor having the oil detection device according to an embodiment.

A configuration to control an oil level in the compressor includes an oil detection device 500 and a driving module 600.

The oil detection device 500 transfers an input signal input to a first connection terminal 541 through a power source unit (not shown) to a reference terminal 517. The reference terminal 517 transfers the input signal, to the first and second reference units 511 and 521, as reference electrodes.

Detection units 510 and 520 of the oil detection device 500 perform charge and discharge operations upon inputting the input signal.

That is, the respective detection units 510 and 520 stop charging the two electrodes, when a voltage between the reference electrode and the detection electrode reaches a maximum charge voltage, and start discharging the electrodes, thus causing a decrease in voltage between the electrodes. Then, the detection units 510 and 520 stop discharging the electrodes when the voltage thereof reaches a minimal discharge voltage, and then performs charging the electrodes again.

The charge and discharge operations of the detection units are determined by a voltage corresponding to a capacitance generated by the reference electrode and the detection electrode and the capacitance depends on dielectric constant between the reference electrode and the detection electrode. This will be described in more detail.

The first detection unit 510 transfers a first detection signal of a capacitance generated by the first base unit 512 and the first augmenting unit 513 corresponding to detection electrodes to the first joint terminal 515 and the first joint terminal 515 transfers the first detection signal through the second connection terminal 542 to the driving module 600.

The second detection unit 520 transfers a second detection signal of a capacitance generated by the second base unit 522 and the second augmenting unit 523 corresponding to detection electrodes to the second joint terminal 525, and the second joint terminal 525 transfers the second detection signal through the third connection terminal 543 to the driving module 600.

Regarding the first detection unit 510 and the second detection unit 520 of the oil detection device 500, dielectric constant is changed according to whether or not the compressor is immersed in an oil and the change in dielectric constant causes a change in capacitance between the electrodes.

The first detection unit 510 and the second detection unit 520 respectively output a voltage signal corresponding to the capacitance changed according to dielectric constant as a detection signal.

That is, whether or not the compressor is immersed in an oil may be determined from the voltage output from each of the detection units 510 and 520.

In addition, the immersion in the oil may be determined from a frequency based on the voltage detected by the respective detection units. This will be described in more detail.

Air has a dielectric constant of about 1 and an oil has a dielectric constant of about 3. When the respective detection units 510 and 520 are immersed in oil, a dielectric constant between the reference unit and the base unit, and a dielectric constant between the reference unit and the first augmenting unit are increased, capacitance is increased and as a result, voltage is decreased. For this reason, charge and discharge times of the respective detection units are increased.

On the other hand, when the respective detection units 510 and 520 are exposed to the air, a dielectric constant between the reference unit and the base unit and a dielectric constant between the reference unit and the first augmenting unit are decreased, capacitance is decreased and as a result, voltage is increased. For this reason, charge and discharge times of the respective detection units are decreased.

That is, a voltage signal which is a detection signal corresponding to a capacitance generated by each detection unit is increased or decreased according to charge and discharge operations of the detection unit and the charge and discharge operations are changed according to immersion of the compressor in an oil.

Frequency is acquired based on charge and discharge times.

That is, the driving module 600 acquires an increase and decrease signal of a voltage corresponding to capacitance generated by the first and second detection units 510 and 520, and acquires a frequency based on change in the acquired voltage. The frequency increases as charge and discharge times decrease and is inversely proportional to capacitance.

In addition, the driving module 600 may convert a voltage signal or a pulse signal of the each detection unit into a digital signal.

Furthermore, as the second connection terminal 542 is electrically and mechanically connected to the third connection terminal 543, the first detection signal and the second detection signal is mixed and the mixed detection signal is then output to the control unit 610 of the driving module.

In addition, the control unit 610 of the driving module may sum voltage signals respectively input from the second connection terminal and the third connection terminal.

The driving module 600 includes a control unit 610, a memory unit 620 and a driving unit 630.

Figure 13:
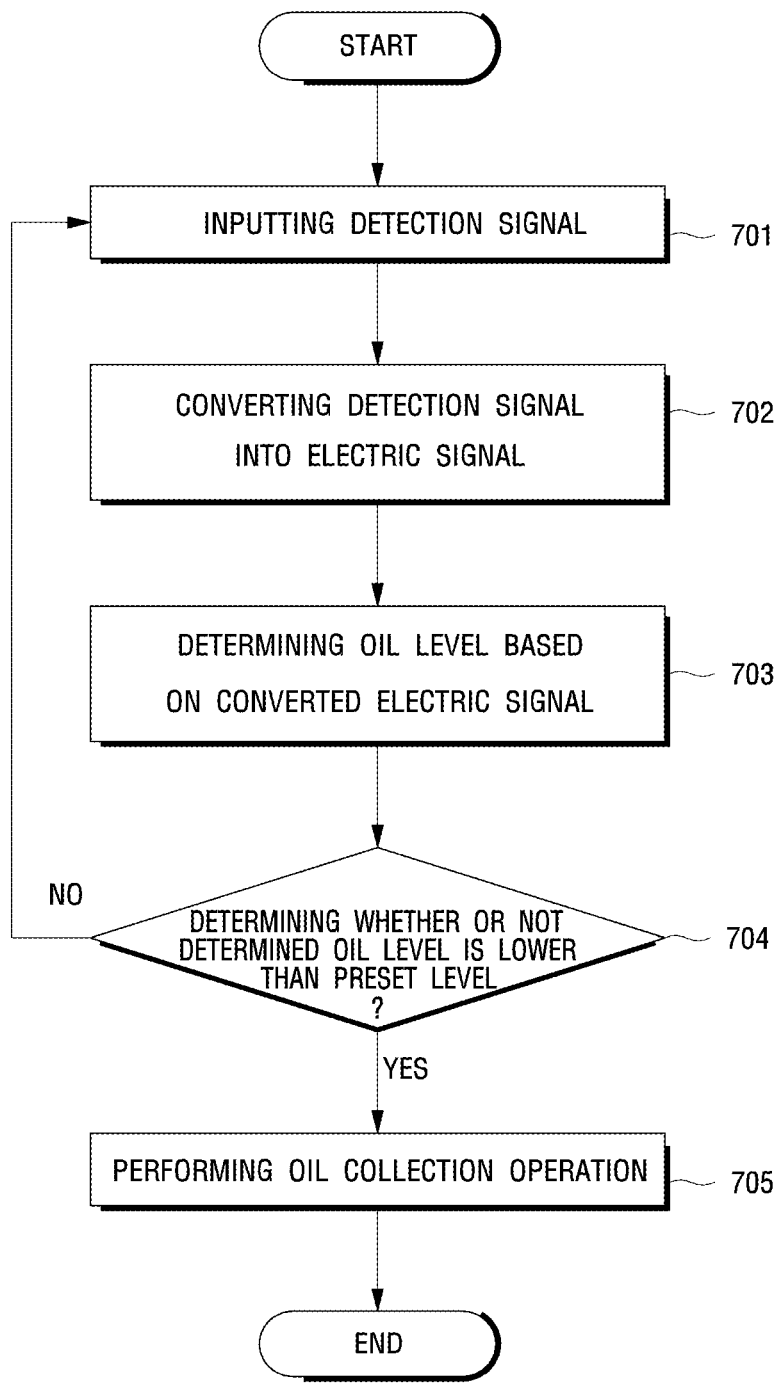
FIG. 13 is a flowchart illustrating a configuration of the compressor provided with an oil detection device according to the embodiment.

Configuration of the control unit 610 will be described with reference to FIG. 13.

The control unit 610 is connected to the first connection terminal, the second connection terminal and the third connection terminal of the oil detection device 500, transmits an input signal to the first connection terminal, inputs a detection signal corresponding to a capacitance through the second connection terminal and the third connection terminal (701), and converts the input detection signal into an electric signal (702).

The detection signal is a mixed voltage signal of voltages corresponding to capacitances respectively generated by the first detection unit and the second detection unit, and the electric signal includes a frequency as a pulse or a digital signal. Furthermore, the control unit 610 may output the voltage signal as an analog signal.

The control unit 610 determines an oil level based on the converted electric signal (703), compares the determined oil level with a preset level and thereby determines whether or not the determined oil level is lower than a preset level (704), and performs an oil collection operation when the determined oil level is determined to be lower than the preset level (705).

The preset level is a level to control the oil collection operation. A frequency in the preset level is a frequency corresponding to a voltage signal detected when all of the first and second detection units are exposed to the air.

The determining the oil level includes confirming a frequency of a pulse signal, and confirming a reference frequency matched with the frequency confirmed among first, second and third reference frequencies.

The control unit 610 further includes a signal processing unit 611 which converts a mixed voltage signal into a pulse signal upon inputting the mixed voltage signal.

This will be described with reference to FIG. 14.

Figure 14:
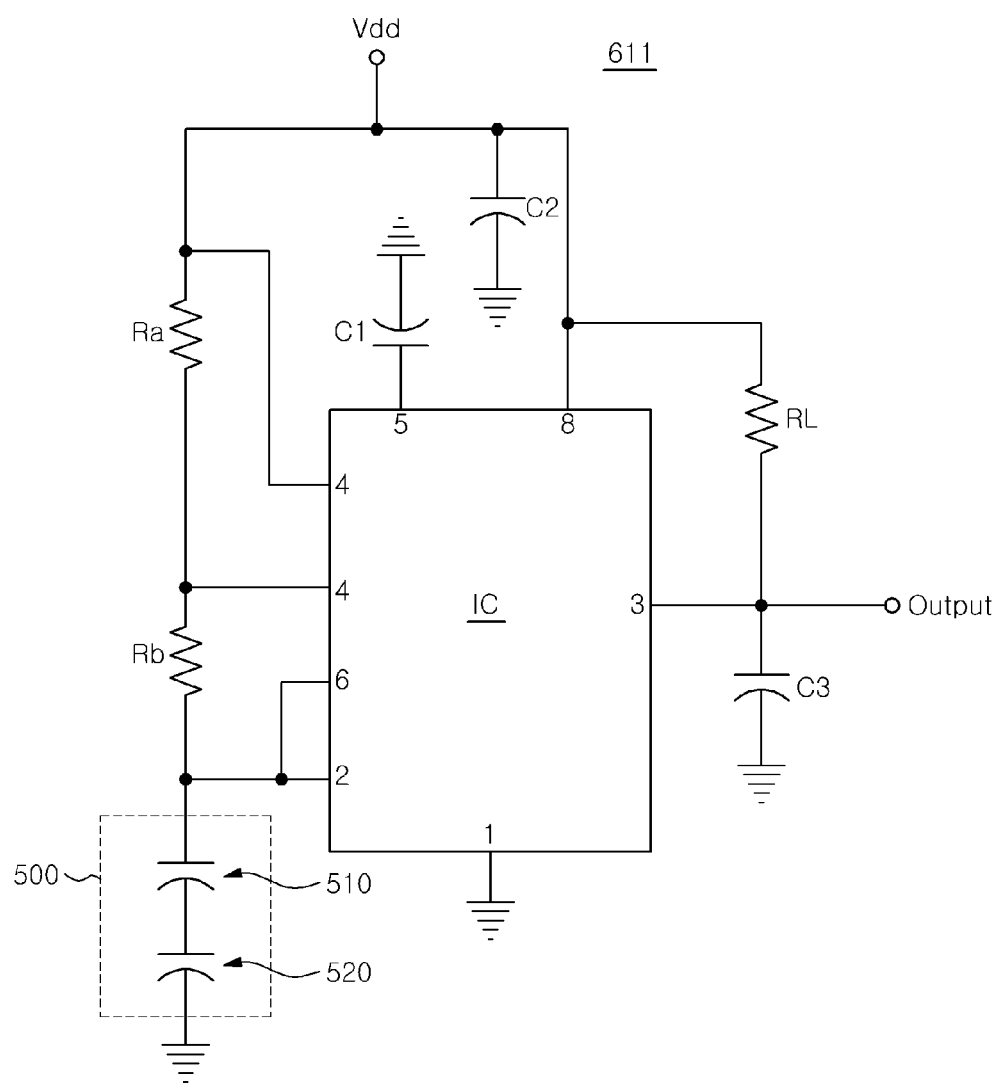
FIG. 14 is a view illustrating a configuration of a signal processing unit to perform signal processing on a signal output from the oil detection device according to the embodiment.

As shown in FIG. 14, the signal processing unit 611 includes an integrated circuit (IC) having an output stage which is connected to an input power supply (Vdd), is connected to the detection units 500 (510, 520), and outputs a voltage signal input by the two detection units 510 and 520 as a pulse signal, a plurality of capacitors C1, C2 and C3 being connected to the integrated circuit (IC) and removing noise, and a plurality of resistances Ra and Rb to regulate a voltage charged and discharged in the first and second detection units 510 and 520.

The two detection units 510 and 520 exhibit high voltage consumption when the resistances Ra and Rb are high, thus being charged for a longer time and discharged for a shorter time than when the resistances Ra and Rb are low.

The integrated circuit of the signal processing unit 611 confirms whether a voltage corresponding to the input combined capacitance is a maximum charge voltage (Vc) or a minimum discharge voltage (Vd).

The maximum charge voltage (Vc) is a voltage of about ⅔ of the input power and the minimum discharge voltage (Vd) is a voltage of about ⅓ of the input power.

The signal processing unit 611 controls the detection unit to perform a discharge operation when the input voltage is the maximum charge voltage and controls the detection unit to perform a charge operation again when the input voltage is the minimum discharge voltage, and outputs a high signal during the charge operation and outputs a low signal during the discharge operation. This will be described with reference to FIG. 14.

As shown in FIG. 14, the signal processing unit 611, upon inputting a voltage corresponding to a capacitance generated by the two detection units, generates a charge and discharge signal based on the input voltage and outputs a pulse signal corresponding to the generated charge and discharge signal.

The first and second detection units of the oil detection device have a capacitance changed according to dielectric constant and output a voltage corresponding to the changed capacitance.

The first and second detection units, upon exposure to the air, are decreased in dielectric constant, and are thus decreased in capacitance and output a high voltage.

On the other hand, the first and second detection units, upon immersion in oil, are increased in dielectric constant and are thus increased in capacitance and output a low voltage.

Accordingly, the first and second detection units have the lowest capacitance when they are exposed to the air, the first and second detection units have the second lowest capacitance when the first detection unit is exposed to the air and the second detection unit is immersed in oil, and the first and second detection units have the highest capacitance when they are immersed in oil.

That is, the first and second detection units have the highest voltage and thus have the shortest charge time when they are exposed to the air, the first and second detection units have the second highest voltage and thus have the second shortest charge time when the first detection unit is exposed to the air and the second detection unit is immersed in oil, and the first and second detection units have the lowest voltage and the longest charge time, when they are immersed in oil.

In other words, as voltage increases, electric current increases, charge time decreases and discharge time also decreases.

Figure 15:
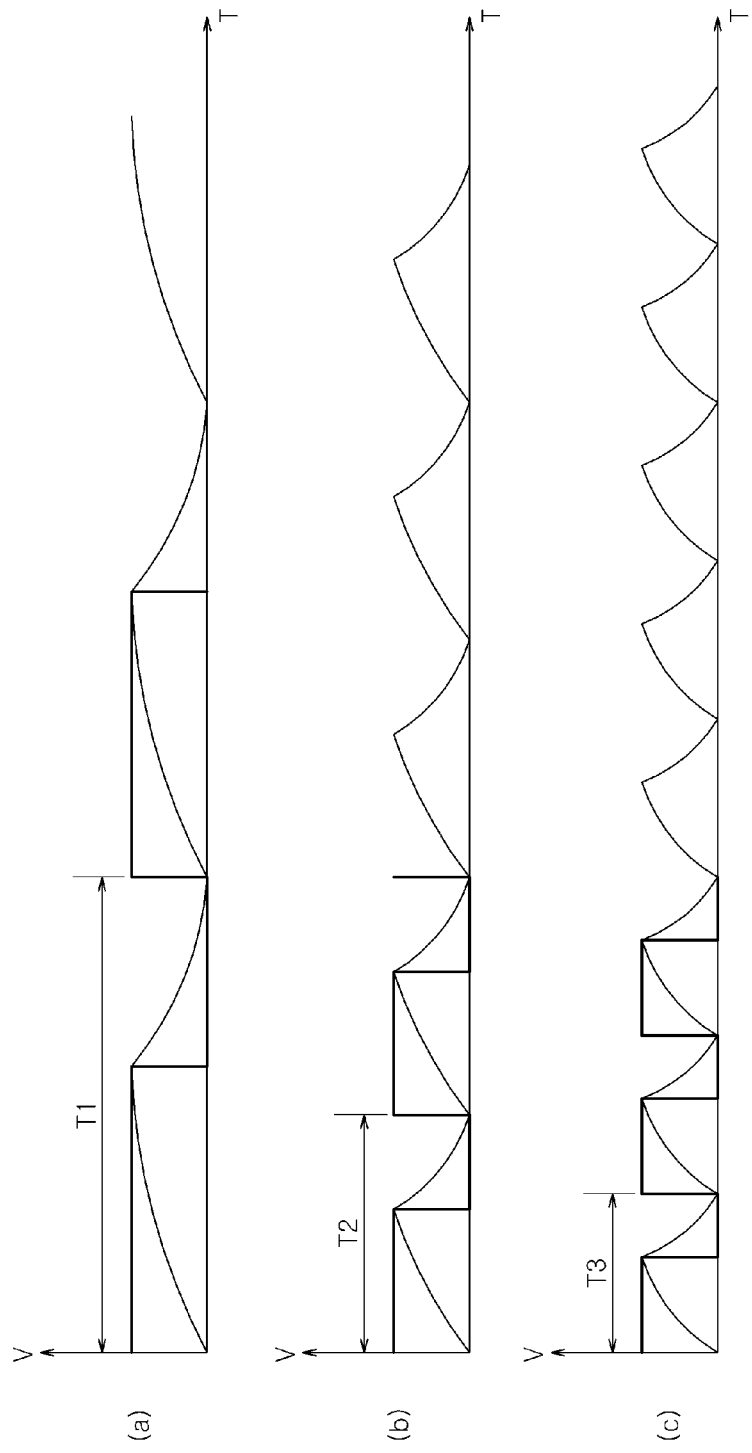
FIG. 15, parts (a), (b) and (c), shows graphs illustrating examples of a signal obtained by signal-processing the output signal of the oil detection device according to the embodiment.

In FIG. 15, (a), (b) and (c) are graphs showing a mixed voltage signal and a pulse signal corresponding to the voltage signal.

In FIG. 15, (a) is a graph showing a voltage signal and a pulse signal corresponding thereto when all of the first and second detection units are immersed in oil, (b) is a graph showing a voltage signal and a pulse signal corresponding thereto when the first detection unit is exposed to the air and the second detection unit is immersed in an oil, and (c) is a graph showing a voltage signal and a pulse signal corresponding thereto when the first and second detection units are exposed to the air.

As shown in (a), (b) and (c) of FIG. 15, charge and discharge times are long when the first and second detection units are immersed in oil, and charge and discharge times are short when the first and second detection units are exposed to the air.

A total of one charge time and one discharge time corresponds to a cycle and frequency is acquired on the basis of a time of one cycle.

The time of the cycle (T1) when all of the first and second detection units are exposed to the air is the longest, the time of the cycle (T2) when the first detection unit is exposed to the air and the second detection unit is immersed in oil is the second longest, and the time of the cycle (T3) when the first and second detection units are exposed to the air is the shortest.

That is, the frequency in inverse proportion to the cycle is the lowest when all of the first and second detection units are immersed in oil and the frequency is the highest when the first and second detection units are exposed to the air.

The control unit 610 compares the converted electric signal as the pulse signal, with a first reference signal, a second reference signal and a third reference signal and thereby confirms the reference signal matched with the converted electric signal, and determines a level of oil based on the confirmed reference signal.

An example of the configuration including the comparing and the determining will be illustrated.

As an example of the confirmation of the oil level, a configuration including converting the mixed voltage signal as the detection signal into a pulse signal, confirming a frequency based on the converted pulse signal and confirming a level of oil based on the confirmed frequency will be described. The first, second and third reference signals are first, second and third reference frequencies.

The control unit 610 confirms a frequency based on the mixed voltage signal, compares the confirmed frequency with first, second and third reference frequencies and thereby confirms the reference frequency matched with the confirmed frequency, and determines a level of oil corresponding to the confirmed reference frequency.

A combined capacitance detected by the two detection units is a maximum and in this case, frequency is a minimum, when all of the first and second detection units are immersed in oil, and a combined capacitance detected by the two detection units is a minimum and in this case, frequency is a maximum, when all of the first and second detection units are exposed to the air.

That is, the oil level is determined to be equal to or higher than a first level when the confirmed frequency is matched with the first reference frequency, the oil level is determined to be equal to or higher than a second level and be lower than the first level when the confirmed frequency is matched with the second reference voltage, and the oil level is determined to be lower than the second level when the confirmed frequency is matched with the third reference voltage.

As another example of the confirmation of the oil level, a configuration including a confirming a level of oil using a combined voltage input at a predetermined time after charging starts will be described. The first, second and third reference signals are first, second and third reference voltages.

The control unit 610 compares a combined voltage input at a predetermined time after charging starts with first, second and third reference voltages and thereby confirms the reference voltage matched with the input voltage, and determines a level of oil corresponding to the confirmed reference voltage.

Capacitance of the two detection units is a maximum, voltage is a minimum and charge time is long when all of the first and second detection units are immersed in oil, and capacitance of the two detection units is a minimum, voltage is a maximum and charge time is short when all of the first and second detection units are exposed to the air.

That is, the voltage input at a predetermined time after charging starts is the highest when the first and second detection units are exposed to the air and is the lowest when the first and second detection units are immersed in oil.

That is, the oil level is determined to be equal to or higher than a first level when the input voltage is matched with the first reference voltage, the oil level is determined to be equal to or higher than a second level and be lower than the first level when the input voltage is matched with the second reference voltage, and the oil level is determined to be lower than the second level when the input voltage is matched with the third reference voltage.

Among the first, second and third reference voltages, the first reference voltage is the lowest.

The memory unit 620 stores information of the first reference signal when the oil level is equal to or higher than the first level, information of the second reference signal when the oil level is equal to or higher than the second level and is lower than the first level, and information of the third reference signal when the oil level is lower than the second level.

The first, second and third reference signals may be voltages as analog signals or frequencies as pulse signals.

The driving unit 630 drives the compressor 100 according to a command of the control unit 610.

The compressor may further include a display unit (not shown).

The display unit visually displays the detected oil level, and indicates that the oil level is within a normal range, or that the oil level is not within a normal range, thereby enabling a user to easily determine the oil level from the outside.

Instead of inputting the signal detected by the first and second detection units as a mixed signal, the control unit 610 may respectively input single detection signals, compare the input respective detection signals with the reference signals and determine a level of oil. This will be described with reference to FIG. 15.

The control unit 610 may convert the respective detection signals into frequencies, and confirm an oil level using the frequencies. In this case, the reference signal for determining the oil level is a reference frequency.

This will be described with reference to FIG. 16.

In FIG. 16, (a) is a graph showing a voltage signal and a pulse signal corresponding thereto when the first detection unit is immersed in oil, and (b) is a graph showing a voltage signal and a pulse signal corresponding thereto when the first detection unit is exposed to the air.

The first detection unit 510 and the second detection unit 520 have a dielectric constant of about 3 when they are immersed in oil and have a dielectric constant of about 1 when they are exposed to the air.

As shown in (a) and (b) of FIG. 16, when the first detection unit 510 is immersed in oil, the first detection unit 510 has a higher capacitance and thus outputs a lower voltage and, as a result, charge and discharge times are longer than when the first detection unit is exposed to the air.

A total of one charge time and one discharge time corresponds to a cycle and frequency is acquired on a basis of a time of one cycle.

A time of the cycle (T4) when the first detection unit is immersed in oil is longer than a time of the cycle (T5) when the first detection unit is exposed to the air. That is, a frequency when the first detection unit is immersed in an oil is lower than a frequency when the first detection unit is exposed to the air. This configuration of the first detection unit applies equally to the second detection unit.

The control unit 610 confirms a frequency corresponding to a voltage signal of the first and second detection units 510 and 520 and thereby compares the confirmed frequency with a reference frequency, and determines a level of oil.

That is, the control unit 610 determines that the first detection units 510 is immersed in oil, when the frequency corresponding to the voltage signal of the first detection unit 510 is equal to or lower than the reference frequency, and determines that the first detection unit 510 is exposed to the air when the frequency corresponding to the voltage signal of the first detection unit 510 is higher than the reference frequency.

In addition, the control unit 610 determines that the first and second detection units are exposed to the air when the frequency corresponding to the voltage signal of the first detection unit 510 is higher than the reference frequency and the frequency corresponding to the voltage signal of the second detection unit is higher than the reference frequency, and determines that the first detection unit is exposed to the air and the second detection unit is immersed in an oil when the frequency corresponding to the voltage signal of the first detection unit 510 is higher than the reference frequency and the frequency corresponding to the voltage signal of the second detection unit is equal to or lower than the reference frequency.

The control unit 610 determines that the oil level is equal to or higher than the first level when all of the first and second detection units are determined to be immersed in oil, determines that the oil level is between the first level and the second level when the first detection unit is determined to be exposed to the air and the second detection unit is determined to be immersed in oil, and determines that the oil level is lower than the second level when all of the first and second detection units are determined to be exposed to the air.

In addition, the control unit 610 may respectively compare voltage signals input at a predetermined time after charging starts with reference signals and thereby determine an oil level. This will be exemplified.

The reference signal for determining the oil level is a reference voltage.

The control unit 610 compares the first voltage input by the first detection unit with the reference voltage and thereby determines whether or not the first voltage is equal to or higher than the reference voltage, determines that the oil level is equal to or higher than the first level when the first voltage is lower than the reference voltage, and determines that the oil level is lower than the first level when the first voltage is equal to or higher than the reference voltage.

The control unit 610 compares the second voltage input by the second detection unit with the reference voltage and thereby determines whether or not the second voltage is equal to or higher than the reference voltage, determines that the oil level is equal to or higher than the second level when the second voltage is lower than the reference voltage, and determines that the oil level is lower than the second level when the second voltage is equal to or higher than the reference voltage.

The control unit 610 determines that the oil level is equal to or higher than the second level and is lower than the first level when the second voltage is lower than the reference voltage and the first voltage is equal to or higher than the reference voltage.

Furthermore, the memory unit 620 may store the reference signal when the oil level is determined using detection signals detected by the respective detection units.

As is apparent from the above description, it may be possible to detect at least two oil levels using a single oil detection device without an excessive cost increase.

It may be possible to solve a problem of misrecognition caused by accumulation and presence of oil between electrodes in detection units when viscosity of oil is high. By reducing accumulation of oil between electrodes in the oil detection device, rapid reaction is obtained and errors are reduced.

In addition, a detection signal is output as a frequency changed according to capacitance or an analog signal, thus enabling response to oil conditions, temperature conditions and the like.

In addition, by converting detection signals detected by a plurality of detection units into analog signals or pulse signals and determining an oil level using the converted signals, two or more oil levels are sensed, response to change in physical property values caused by temperatures or impurities is possible, a signal processing configuration is simplified and misoperation caused by noise is prevented.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An oil detection device for a compressor to detect a level of oil in the compressor comprising:
    a first detection unit comprising a first reference electrode and a first detection electrode disposed at both sides of the first reference electrode; and
    a second detection unit comprising a second reference electrode spaced from the first reference electrode and a second detection electrode disposed at both sides of the second reference electrode.

2. The oil detection device according to claim 1, wherein the first detection electrode comprises a first base unit spaced from one side of the first reference electrode by a predetermined distance and a first augmenting unit spaced from the other side of the first reference electrode by a predetermined distance, and
    the second detection electrode comprises a second base unit spaced from one side of the second reference electrode by a predetermined distance and a second augmenting unit spaced from the other side of the second reference electrode by a predetermined distance.

3. The oil detection device according to claim 2, wherein the first base unit and the first augmenting unit are parallel to the first reference electrode, and
    the second base unit and the second augmenting unit are parallel to the second reference electrode.

4. The oil detection device according to claim 2, wherein the first base unit and the first augmenting unit are nonparallel to the first reference electrode, and the second base unit and the second augmenting unit are nonparallel to the second reference electrode.

5. The oil detection device according to claim 2, wherein the first detection unit further comprises at least one first connection member to connect the first base unit to the first augmenting unit, and
the second detection unit further comprises at least one second connection member to connect the second base unit to the second augmenting unit.

6. The oil detection device according to claim 1, further comprising a spacing member to connect the first reference electrode to the second reference electrode such that the first reference electrode is spaced from the second reference electrode.

7. The oil detection device according to claim 1, further comprising:
a first flow unit disposed on the first reference electrode, the first flow unit inducing flow of the oil; and
a second flow unit disposed on the second reference electrode, the second flow unit inducing flow of the oil.

8. The oil detection device according to claim 7, wherein the first flow unit extends in the direction of gravity from the first reference electrode and has a predetermined inclination from one side to the other side.

9. The oil detection device according to claim 7, wherein the second flow unit extends in the direction of gravity from the second reference electrode and has a predetermined inclination from one side to the other side.

10. The oil detection device according to claim 7, wherein the first flow unit extends in the direction of gravity from the first reference electrode and has a triangular shape.

11. The oil detection device according to claim 7, wherein the second flow unit extends in the direction of gravity from the second reference electrode and has a triangular shape.

12. The oil detection device according to claim 7, wherein, the first flow unit extends in the direction of gravity from the first reference electrode and has a saw-tooth shape.

13. The oil detection device according to claim 7, wherein the second flow unit extends in the direction of gravity from the second reference electrode and has a saw-tooth shape.

14. The oil detection device according to claim 7, wherein the first flow unit has the same shape as the second flow unit and the first flow unit has a different size from the second flow unit.

15. The oil detection device according to claim 3, wherein the first detection unit outputs, as a first detection signal, a signal corresponding to a capacitance between the first reference electrode and the first base unit, and a capacitance between the first reference electrode and the first augmenting unit, and
the second detection unit outputs, as a second detection signal, a signal corresponding to a capacitance between the second reference electrode and the second base unit and a capacitance between the second reference electrode and the second augmenting unit.

16. The oil detection device according to claim 15, wherein the first detection unit outputs a mixed one of the first detection signal and the second detection signal of the second detection unit when outputting the first detection signal.

17. An oil detection device for a compressor comprising:
a reference unit to which an input signal is applied;
a base unit disposed at one side of the reference unit, the base unit outputting a detection signal;
a first augmenting unit disposed at the other side of the reference unit, the first augmenting unit outputting a detection signal; and
a flow unit disposed in any one of the reference unit, the base unit and the first augmenting unit, the flow unit forming a passage in which an oil flows.

18. The oil detection device according to claim 17, wherein the base unit is electrically connected to the first augmenting unit.

19. The oil detection device according to claim 17, wherein the flow unit extends from any one of the reference unit, the base unit and the first augmenting unit in the direction of gravity.

20. The oil detection device according to claim 17, wherein the reference unit, the base unit and the first augmenting unit have a plate shape, and
the reference unit, the base unit and the first augmenting unit are disposed such that opposite surfaces thereof are parallel to one another.

21. The oil detection device according to claim 17, wherein the reference unit, the base unit and the first augmenting unit have a plate shape, and
the reference unit, the base unit and the first augmenting unit are disposed such that opposite surfaces thereof are nonparallel to one another.

22. The oil detection device according to claim 17, wherein the flow unit has at least one shape of triangular, saw-tooth and arch shapes.

23. An oil detection device for a compressor to detect a level of an oil in the compressor comprising:
a first detection unit comprising a first reference electrode and a first detection electrode disposed at both sides of the first reference electrode; and
a second detection unit comprising a second reference electrode spaced from the first reference electrode and a second detection electrode disposed at both sides of the second reference electrode,
wherein the first detection electrode of the first detection unit and the second detection electrode of the second detection unit are electrically connected to each other and transmit a detection signal to a control unit to control an oil collection operation.

24. The oil detection device according to claim 23, further comprising:
an input terminal to input an input signal to the first reference electrode and the second reference electrode, and
an output terminal connected to the first detection electrode and the second detection electrode, the output terminal outputting a detection signal of the first detection electrode and the second detection electrode.

25. A compressor comprising:
a first detection unit comprising a first reference electrode and a first detection electrode disposed at both sides of the first reference electrode;
a second detection unit comprising a second reference electrode spaced from the first reference electrode and a second detection electrode disposed at both sides of the second reference electrode; and
a control unit converting a detection signal input from the first detection unit and the second detection unit into an electric signal, the control unit determining a level of an oil based on the converted electric signal.

26. The compressor according to claim 25, wherein the electric signal is a frequency or a voltage signal.

27. The compressor according to claim 25, wherein the first detection electrode comprises a first base unit spaced by a predetermined distance from one side of the first reference electrode and a first augmenting unit spaced by a predetermined distance from the other side of the first reference electrode, and the second detection electrode comprises a second base unit spaced by a predetermined distance from one side of the second reference electrode and a second augmenting unit spaced by a predetermined distance from the other side of the second reference electrode.

28. The compressor according to claim 27, wherein the first augmenting unit outputs a voltage corresponding to a capacitance generated by the first base unit, and the second augmenting unit outputs a voltage corresponding to a capacitance generated by the second base unit.

29. The compressor according to claim 25, wherein the control unit controls an oil collection operation based on the level of the oil.

30. The compressor according to claim 25, wherein the first base unit and the first augmenting unit are parallel to the first reference electrode, and the second base unit and the second augmenting unit are parallel to the second reference electrode.

31. The compressor according to claim 25, wherein the first base unit and the first augmenting unit have a predetermined inclination with respect to the first reference electrode, and the second base unit and the second augmenting unit have a predetermined inclination with respect to the second reference electrode.

32. The compressor according to claim 25, further comprising:

a first flow unit disposed on the first reference electrode, the first flow unit inducing flow of the oil; and a second flow unit disposed on the second reference electrode, the second flow unit inducing flow of the oil.

33. The compressor according to claim 32, wherein the first flow unit extends in the direction of gravity from the first reference electrode and has a predetermined inclination from one side to the other side.

34. The compressor according to claim 32, wherein the second flow unit extends in the direction of gravity from the second reference electrode and has a predetermined inclination from one side to the other side.

35. The compressor according to claim 32, wherein the first flow unit extends in the direction of gravity from the first reference electrode and has at least one shape of triangular, saw-tooth and arch shapes.

36. The compressor according to claim 32, wherein the second flow unit extends in the direction of gravity from the second reference electrode and has at least one shape of triangular, saw-tooth and arch shapes.

37. The compressor according to claim 25, wherein the control unit transmits an input signal to the first reference electrode of the first detection unit and the second reference electrode of the second detection unit, and inputs a combined voltage corresponding to capacitances generated by the first detection electrode of the first detection unit and the second detection electrode of the second detection unit.

38. A method of controlling a compressor comprising:

inputting a detection signal from a first detection unit and a second detection unit disposed in the compressor;

converting the input detection signal into an electric signal;

determining a level of an oil in the compressor based on the converted electric signal; and controlling an oil collection operation when the determined oil level is lower than a preset level.

39. The method according to claim 38, wherein the inputting comprises inputting the detection signal of the first detection unit and the second detection unit from one detection terminal.

40. The method according to claim 38, wherein the converting comprises converting a voltage signal corresponding to a capacitance generated by the first detection unit and the second detection unit into a pulse signal.

41. The method according to claim 39, wherein the determining comprises:

confirming a frequency corresponding to the pulse signal; and determining the level of the oil based on the confirmed frequency.

42. An oil detection device for a compressor comprising:

first and second reference units to which an input signal is applied;

first and second base units disposed at one side of the first and reference units, respectively, the first and second base units each outputting a detection signal; and first and second augmenting units disposed at the other side of the first and second reference units, respectively, the first and second augmenting units each outputting a detection signal; and a spacing unit to mechanically and electrically connect the first reference unit to the second reference unit, the spacing unit being configured so that the first reference unit, first base unit and first augmenting unit are disposed above the second reference unit, second base unit and second augmenting unit.

43. The oil detection device according to claim 42, further comprising a flow unit disposed in any one of the first reference unit, first base unit, first augmenting unit, second reference unit, second base unit and second augmenting unit, wherein the flow unit is configured guide oil away from the any one of the first reference unit, first base unit, first augmenting unit, second reference unit, second base unit and second augmenting unit to which the flow unit is disposed.

44. The oil detection device according to claim 43, wherein the flow unit has at least one shape of triangular, saw-tooth and arch shapes.

* * * * *